(12) United States Patent
Grodecki et al.

(10) Patent No.: US 10,406,961 B2
(45) Date of Patent: Sep. 10, 2019

(54) MULTI-TANK AIR CART TENDER WITH INDIVIDUAL TANK CONVEYORS

(71) Applicant: Morris Industries Ltd., Saskatoon (CA)

(72) Inventors: Lawrence S. Grodecki, Yorkton (CA); Vincent A. Colistro, Saskatoon (CA); Terrance A. Friggstad, Grasswood (CA); Don K. Henry, Regina (CA); John A. Lesanko, Sturgis (CA); Clint W. Sheppard, Yorkton (CA)

(73) Assignee: Morris Industries LTD. (CA)

( * ) Notice: Subject to any disclaimer, the term of this patent is extended or adjusted under 35 U.S.C. 154(b) by 522 days.

(21) Appl. No.: 15/178,067

(22) Filed: Jun. 9, 2016

(65) Prior Publication Data
US 2016/0362036 A1    Dec. 15, 2016

Related U.S. Application Data

(60) Provisional application No. 62/173,775, filed on Jun. 10, 2015.

(51) Int. Cl.
 *B60P 1/40* (2006.01)
 *A01D 90/10* (2006.01)
 *A01C 15/00* (2006.01)

(52) U.S. Cl.
 CPC .............. *B60P 1/40* (2013.01); *A01C 15/003* (2013.01); *A01D 90/10* (2013.01)

(58) Field of Classification Search
 CPC . B60P 1/40; B60P 1/42; A01C 15/003; A01D 90/10
 See application file for complete search history.

(56) References Cited

U.S. PATENT DOCUMENTS

| | | | | |
|---|---|---|---|---|
| 4,119,223 A | * | 10/1978 | Fiechter | A01D 90/10 198/317 |
| 4,613,275 A | * | 9/1986 | Karlowsky | B60P 1/40 198/632 |

(Continued)

OTHER PUBLICATIONS

Lyseng, Ron. "Cart keeps drills from dawdling." The Western Producer website: www.producer.com/2004/11/cart-keeps-drills-from-dawdling/. Published online Nov. 11, 2004.

(Continued)

*Primary Examiner* — Saul Rodriguez
*Assistant Examiner* — Ashley K Romano
(74) *Attorney, Agent, or Firm* — Hovey Williams LLP

(57) ABSTRACT

A vehicle includes a frame, a plurality of tanks supported on the frame and housing particulate, an unloading system, a lifting mechanism, and a positioning system. The unloading system includes a plurality of individual carriers, each of which corresponds to one or more of the tanks. Each of the carriers defines a discharge opening for dispensing particulate unloaded from one or more of the tanks. The carriers are mounted to the frame such that the carriers are supported independently of the tanks. The lifting mechanism includes a shiftable positioning rail that at least partially supports each of the carriers, with generally vertical shifting of the positioning rail simultaneously raising or lowering each of the discharge openings. The positioning system includes a plurality of positioning devices, with shifting of each of the positioning devices resulting in fore-and-aft shifting of the corresponding one or more of the discharge openings.

31 Claims, 39 Drawing Sheets

(56) References Cited

U.S. PATENT DOCUMENTS

| | | | | |
|---|---|---|---|---|
| 4,963,066 | A * | 10/1990 | Boppart | B60P 1/40 198/311 |
| 5,484,249 | A * | 1/1996 | Klatt | A01C 15/003 414/332 |
| 5,718,556 | A * | 2/1998 | Forsyth | B60P 1/36 198/317 |
| 6,113,339 | A * | 9/2000 | Adams | B60P 1/42 198/314 |
| 2008/0156907 | A1 * | 7/2008 | Tremblay | A01C 15/007 239/656 |
| 2008/0210145 | A1 * | 9/2008 | Petersen | A01C 15/003 111/11 |
| 2010/0193411 | A1 * | 8/2010 | Redekop | A01D 90/02 209/509 |
| 2012/0103238 | A1 * | 5/2012 | Beaujot | A01C 7/06 111/174 |
| 2014/0261115 | A1 * | 9/2014 | Kowalchuk | A01C 7/046 111/120 |
| 2014/0284118 | A1 * | 9/2014 | Van Mill | B65G 43/00 177/1 |
| 2015/0021365 | A1 * | 1/2015 | Ruiz Garcia | A01C 19/04 222/618 |
| 2015/0237804 | A1 * | 8/2015 | Van Mill | A01D 90/10 414/523 |
| 2016/0150721 | A1 * | 6/2016 | Henry | A01C 7/102 111/170 |
| 2016/0185476 | A1 * | 6/2016 | Farris | B65B 69/0008 111/200 |
| 2016/0207017 | A1 * | 7/2016 | Montag | A01C 15/006 |
| 2016/0207018 | A1 * | 7/2016 | Montag | B65G 53/48 |
| 2016/0255767 | A1 * | 9/2016 | Borkgren | A01C 7/081 |
| 2016/0304300 | A1 * | 10/2016 | Beaujot | A01B 79/005 |
| 2017/0086355 | A1 * | 3/2017 | Borkgren | A01C 7/084 |
| 2017/0118914 | A1 * | 5/2017 | Bruns | A01B 76/00 |
| 2018/0002113 | A1 * | 1/2018 | Drenth | A01C 15/122 |

OTHER PUBLICATIONS

Hagen, John. Forum post including "seed tender 3.JPG" photograph; part of Machinery Talk V-6 Chevy Motor Forum. AgTalk website: talk.newagtalk.com/forums/thread-view.asp?tid=268481. Published online Nov. 20, 2011.

@HorschLLC. Twitter post. twitter.com/horschllc/status/598841722206982144. Published online May 14, 2015.

@HorschLLC. Twitter post. twitter.com/HorschLLC/status/611219474000142337. Published online Jun. 17, 2015.

Realag Machinery Insider. "Horsch Brings Back Airseeder Tender Concept." realagriculture website: www.realagriculture.com/2015/07/horsch-brings-back-airseeder-tender-concept/. Published online Jul. 12, 2015.

Stenum, Alan. "Canada's Farm Progress Show Highlights Product Innovations." Farm Equipment website: www.farm-equipment.com/articles/11787-canadas-farm-progress-show-highlights-product-innovations. Published online Jul. 16, 2015.

@HorschLLC. Twitter post. twitter.com/horschllc/status/730649228704284673. Published online May 11, 2016.

* cited by examiner

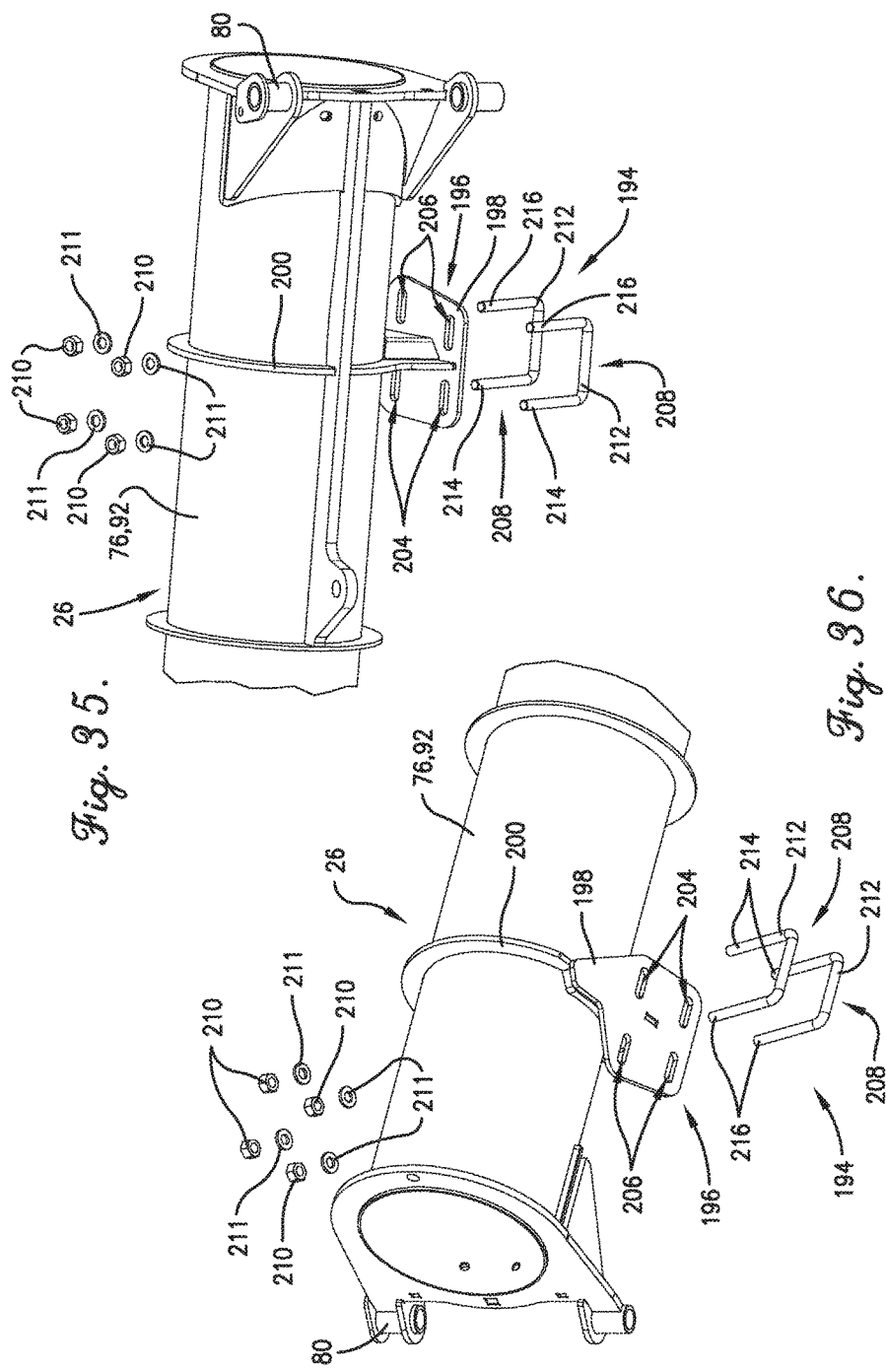

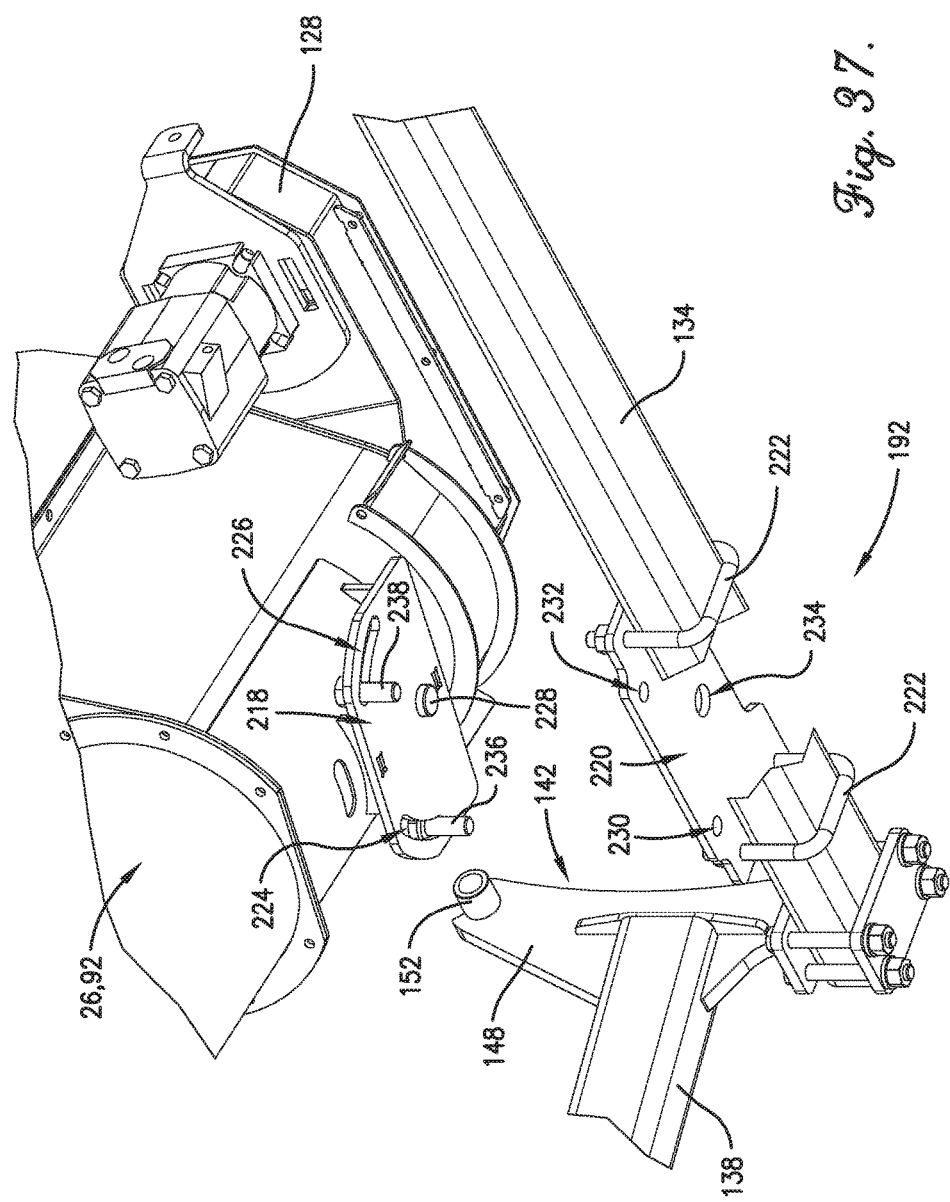

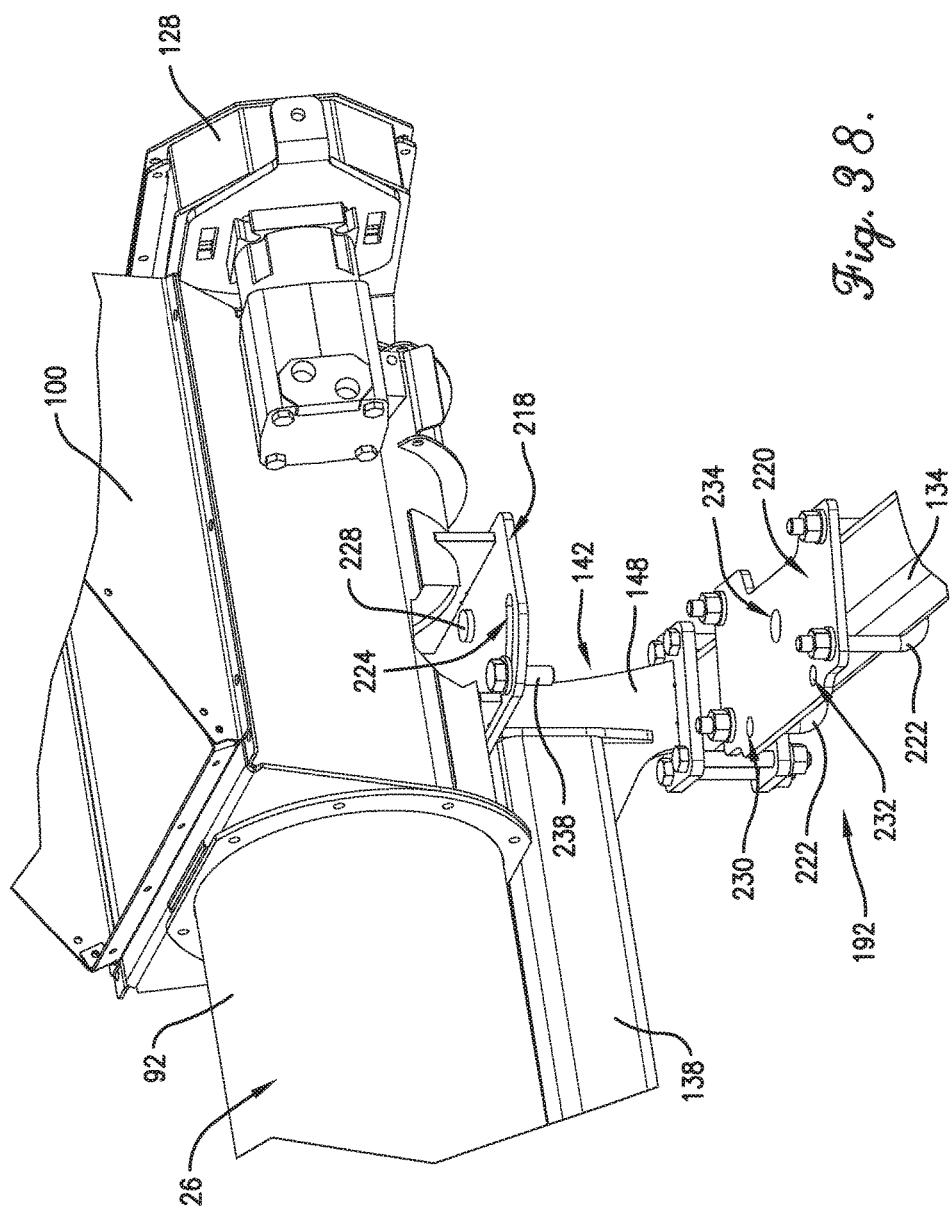

MULTI-TANK AIR CART TENDER WITH INDIVIDUAL TANK CONVEYORS

CROSS-REFERENCE TO RELATED APPLICATION

The present application claims priority from U.S. Provisional Patent Application No. 62/173,775, filed Jun. 10, 2015, the entire disclosure of which is hereby incorporated by reference herein.

BACKGROUND OF THE INVENTION

1. Field of the Invention

The present invention relates generally to an agricultural vehicle for receiving, storing, transporting, and/or unloading particulate. Among other things, for instance, the vehicle may function during planting season as an air cart tender, providing seed and fertilizer to an air seeder, or during harvest as a grain cart, receiving grain from a combine and subsequently unloading the grain into a semi-trailer, grain bagging system, etc.

2. Discussion of the Prior Art

Those of ordinary skill in the art will appreciate that a tender vehicle is often used in association with an air cart as part of agricultural seeding, fertilizing, and other operations. More particularly, a tender vehicle may conventionally be used to supply an air cart with seed, fertilizer, etc. to be planted or distributed during an agricultural operation.

Those of ordinary skill in the art will also appreciate that grain carts are often used in association with combines as part of agricultural harvest operations. More particularly, a grain cart may conventionally be used to receive harvested grain from a combine and transfer the grain to a semi-trailer, grain bagging system, or other vehicle or device.

SUMMARY

According to one aspect of the present invention, a vehicle is provided. The vehicle comprises a frame, a plurality of tanks supported on the frame, and an unloading system. Each of the tanks defines a tank interior configured to house particulate. The unloading system is configured to unload the particulate from the tank interiors. The unloading system includes a plurality of individual carriers, each of which corresponds to one or more of the tanks. Each of the carriers defines an intake opening for receiving particulate from the corresponding one or more of the tanks, a discharge opening for dispensing particulate, a particulate pathway extending between and interconnecting the intake opening and the discharge opening, and a conveying mechanism for moving particulate along the pathway. The carriers are mounted to the frame such that the carriers are supported independently of the tanks.

Among other things, provision of carriers that are supported independently of the tanks enables accurate quantification (e.g., weighing) of particulate contained in the tanks, reconfiguration of the tanks independently of the carriers, and adjustable positioning of the carriers independently of the tanks.

According to another aspect of the present invention, a vehicle is provided. The vehicle comprises a frame, a plurality of tanks supported on the frame, an unloading system, and a lifting mechanism. Each of the tanks defines a tank interior configured to house particulate. The unloading system is configured to unload the particulate from the tank interiors. The unloading system includes a plurality of individual carriers, each of which corresponds to one or more of the tanks. Each of the carriers defines an intake opening for receiving particulate from the corresponding one or more of the tanks, a discharge opening for dispensing particulate, a particulate pathway extending between and interconnecting the intake opening and the discharge opening, and a conveying mechanism for moving particulate along the pathway. The lifting mechanism serves to adjustably vertically position each of the discharge openings. The lifting mechanism includes a shiftable positioning rail that at least partially supports each of the carriers, with generally vertical shifting of the positioning rail simultaneously raising or lowering each of the discharge openings.

Among other things, the provision of a lifting mechanism for adjustably vertically positioning each of the discharge openings, wherein the lifting mechanism includes a shiftable positioning rail that at least partially supports each of the carriers, with generally vertical shifting of the positioning rail simultaneously raising or lowering each of the discharge openings, enables efficient raising and lowering of the discharge openings to accommodate any of a variety of unloading scenarios. For instance, the vertical position of the discharge openings might be adjusted for unloading into an air seeder, a semi-trailer, or a grain bagging system.

According to yet another aspect of the present invention, a vehicle is provided. The vehicle comprises a frame, a plurality of tanks supported on the frame, an unloading system, and a carrier positioning system. Each of the tanks defines a tank interior configured to house particulate. The unloading system is configured to unload the particulate from the tank interiors. The unloading system includes a plurality of individual carriers, each of which corresponds to one or more of the tanks. Each of the carriers defines an intake opening for receiving particulate from the corresponding one or more of the tanks, a discharge opening for dispensing particulate, a particulate pathway extending between and interconnecting the intake opening and the discharge opening, and a conveying mechanism for moving particulate along the pathway. The carrier positioning system includes an elongated positioning rail and a plurality of positioning devices mounted to the positioning rail and corresponding to respective ones of the carriers. Each of the positioning devices has an unlocked configuration enabling independent shifting of the positioning device along the positioning rail and a locked configuration at least substantially restricting shifting of the positioning device along the positioning rail. Shifting of each of the positioning devices results in shifting of the corresponding one of the discharge openings.

Among other things, the provision of a carrier positioning system including positioning devices that enable independent shifting of corresponding ones of the discharge openings of the carriers enables efficient reconfiguration of the vehicle for use in applications requiring varied output locations.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein:

FIG. 35 is an enlarged, partially fragmented top perspective view particularly illustrating features of a selected one of the carriers and upper positioning devices;

FIG. 36 is a bottom perspective view of the carrier and upper positioning device of FIG. 35;

FIG. 37 is an enlarged, fragmentary exploded bottom perspective view particularly illustrating pivot-enabling and elevation change-enabling structures adjacent the intake opening of a selected one of the carriers;

FIG. 38 is an exploded top perspective view of the pivot-enabling and elevation change-enabling structures of FIG. 37;

Figure 1:
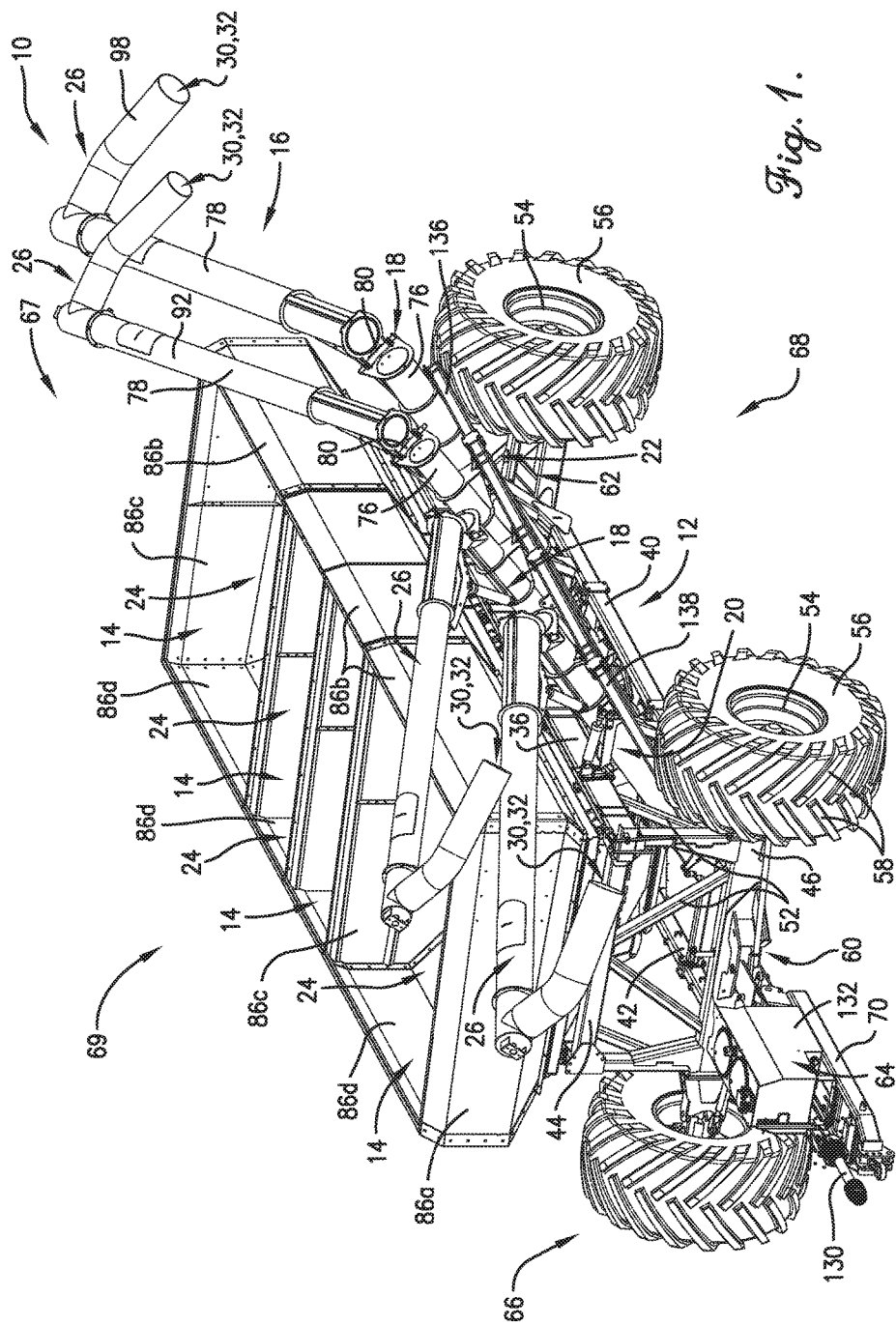
FIG. 1 is a front perspective view of a vehicle according to a first preferred embodiment of the present invention, configured for transport.
Figure 2:
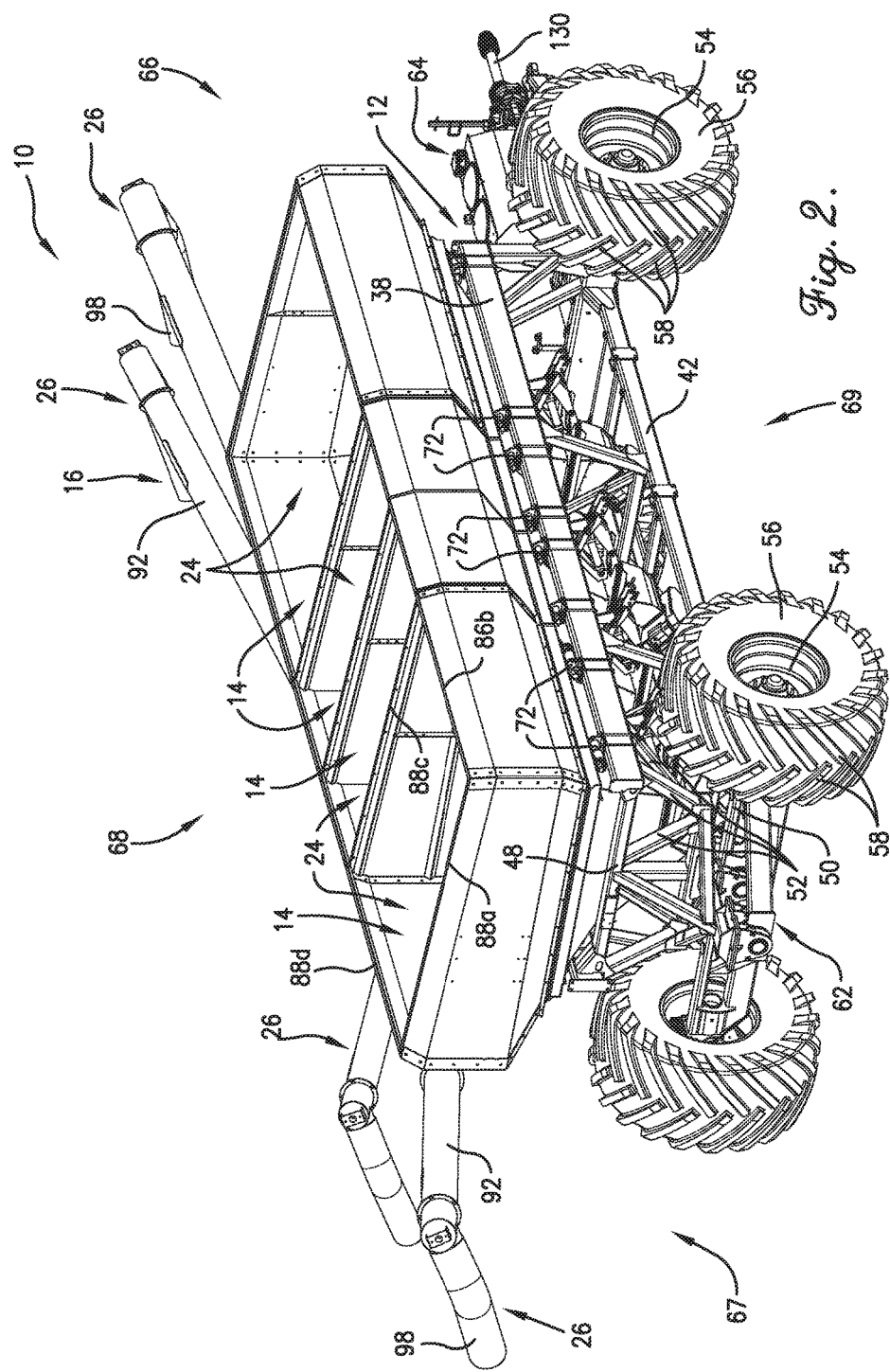
FIG. 2 is rear perspective view of the vehicle of FIG. 1, configured for transport.
Figure 3:
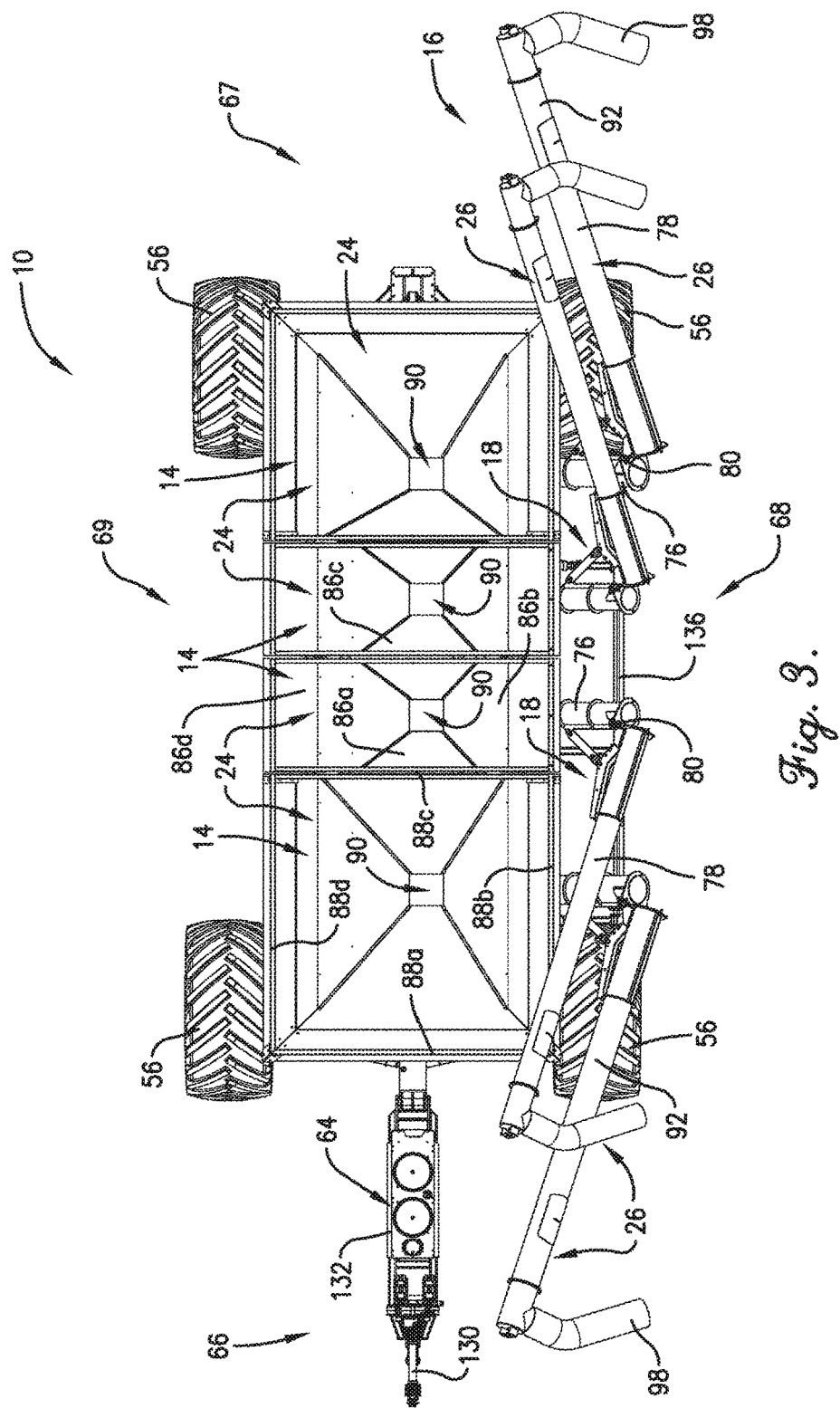
FIG. 3 is a top view of the vehicle of FIGS. 1 and 2, configured for transport.
Figure 4:
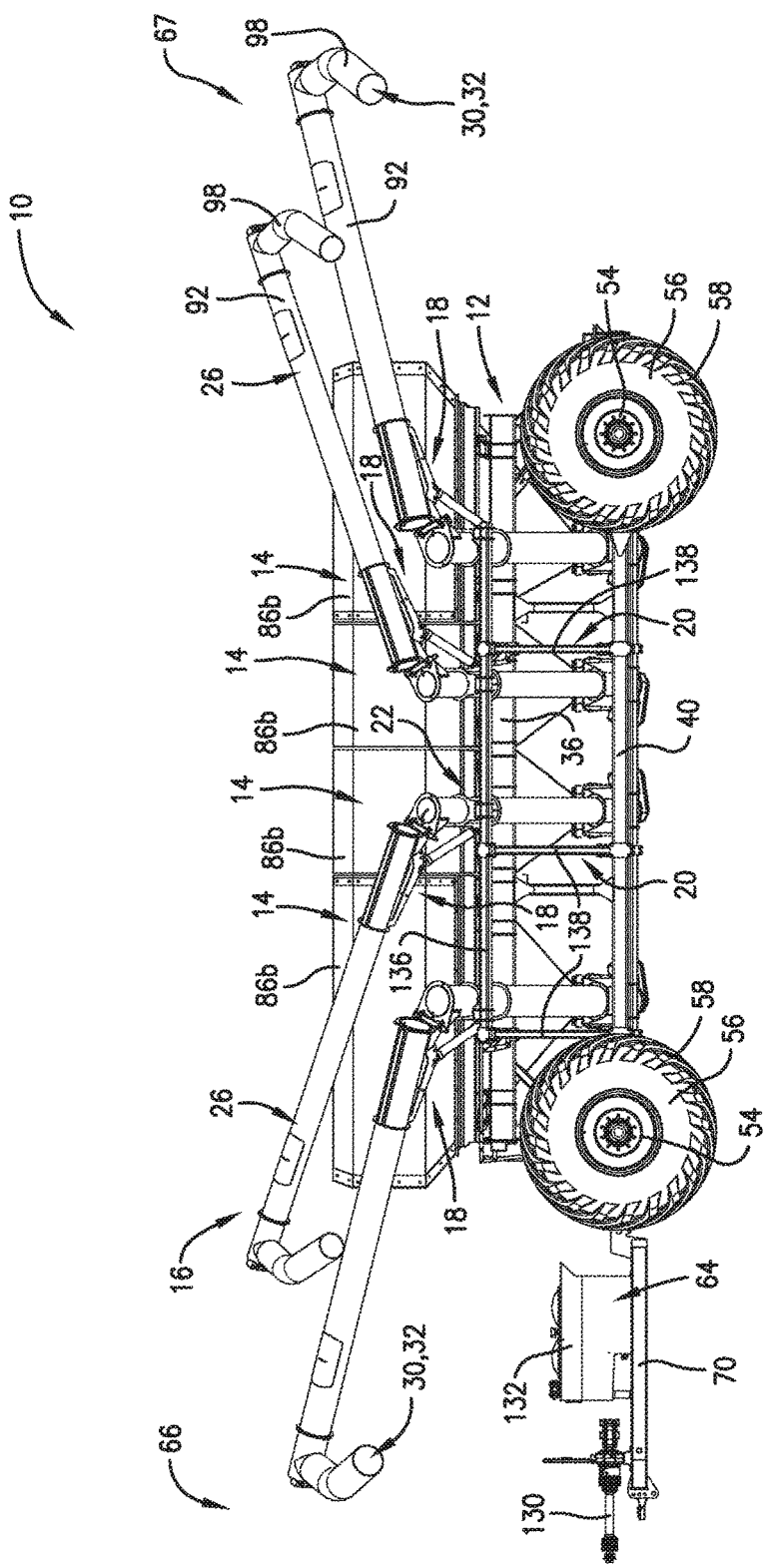
FIG. 4 is a side view of the vehicle of FIGS. 1-3, configured for transport.
Figure 5:
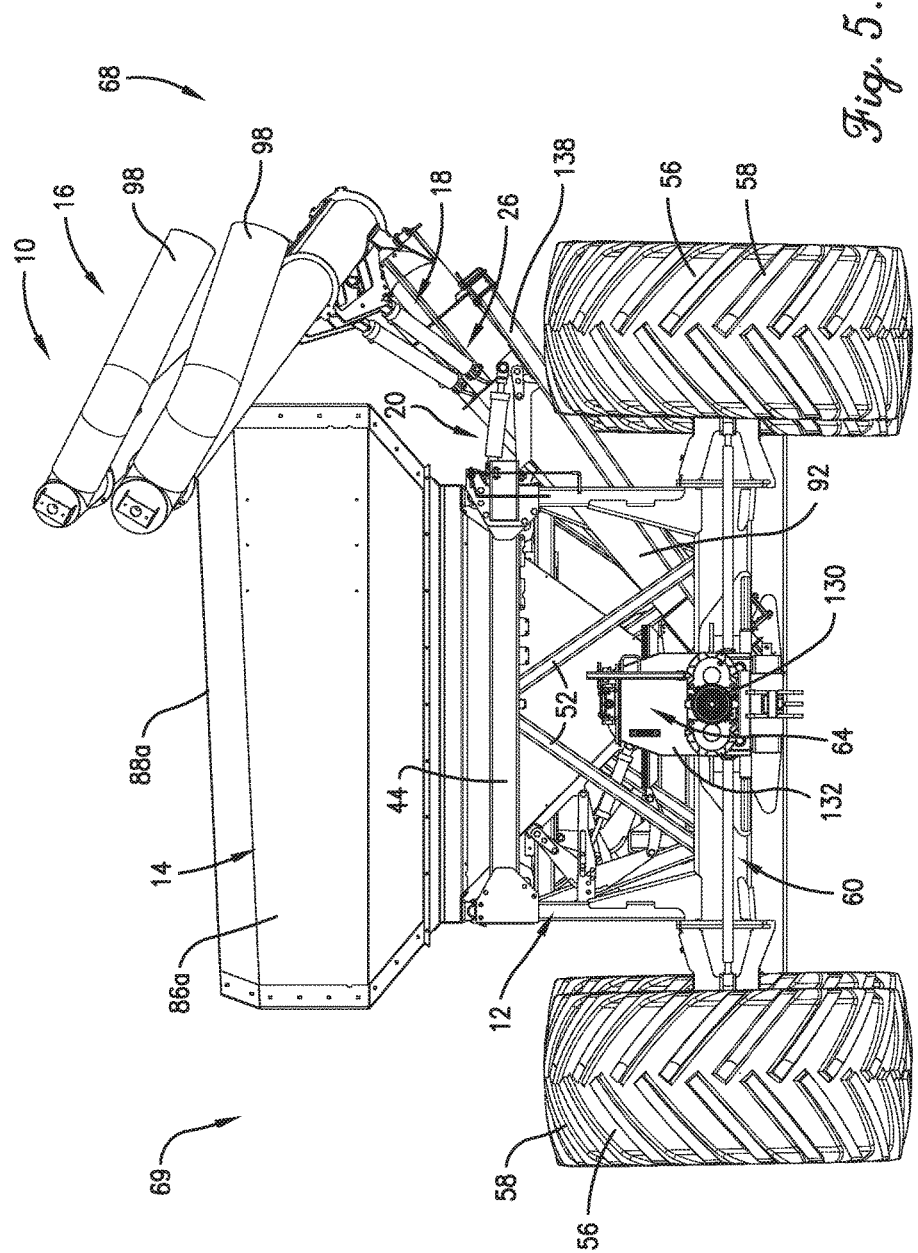
FIG. 5 is a front view of the vehicle of FIGS. 1-4, configured for transport.
Figure 6:
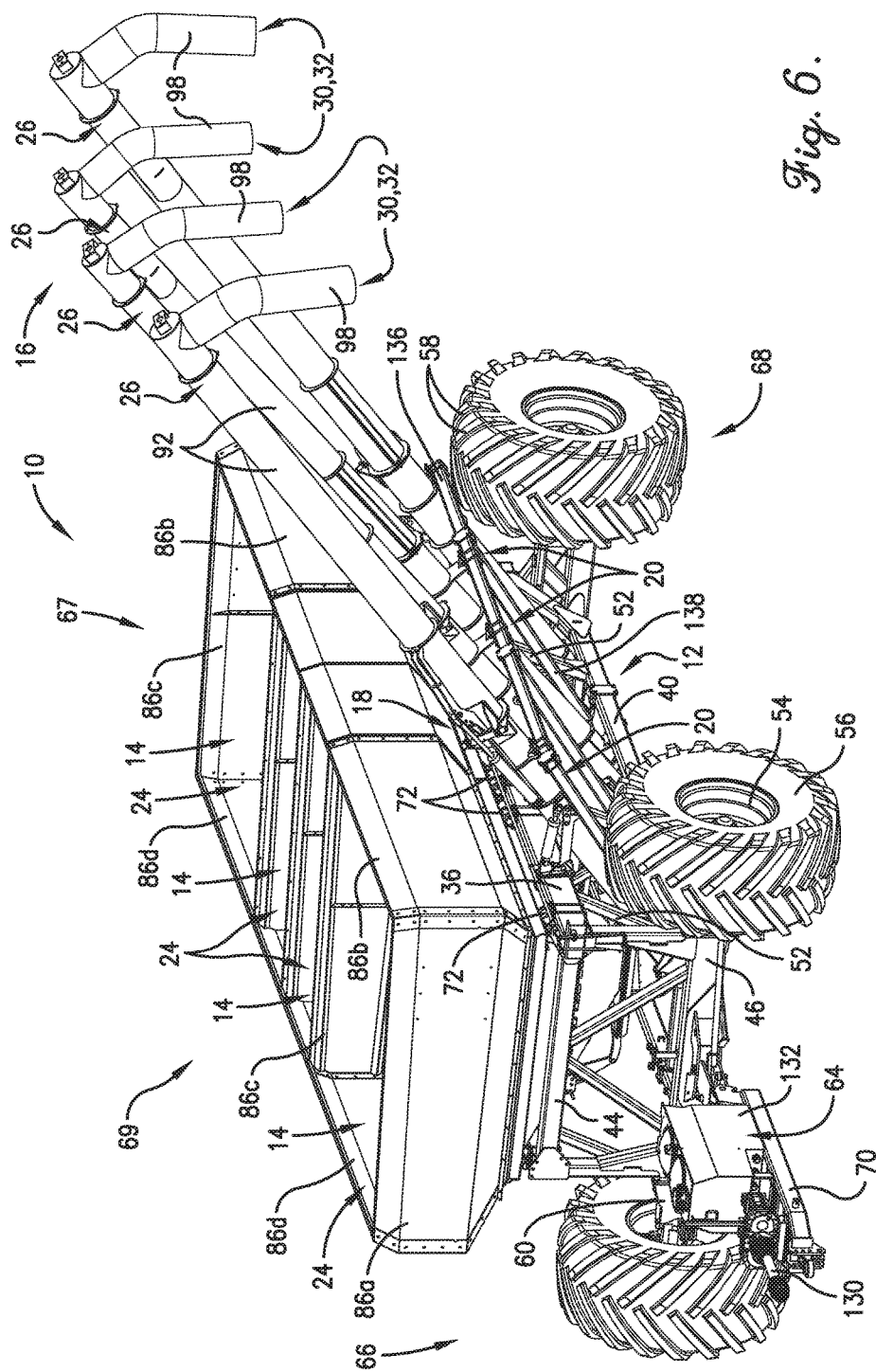
FIG. 6 is a front perspective view of the vehicle of FIGS. 1-5, configured as an air cart tender and with the carriers in an elevated position.
Figure 7:
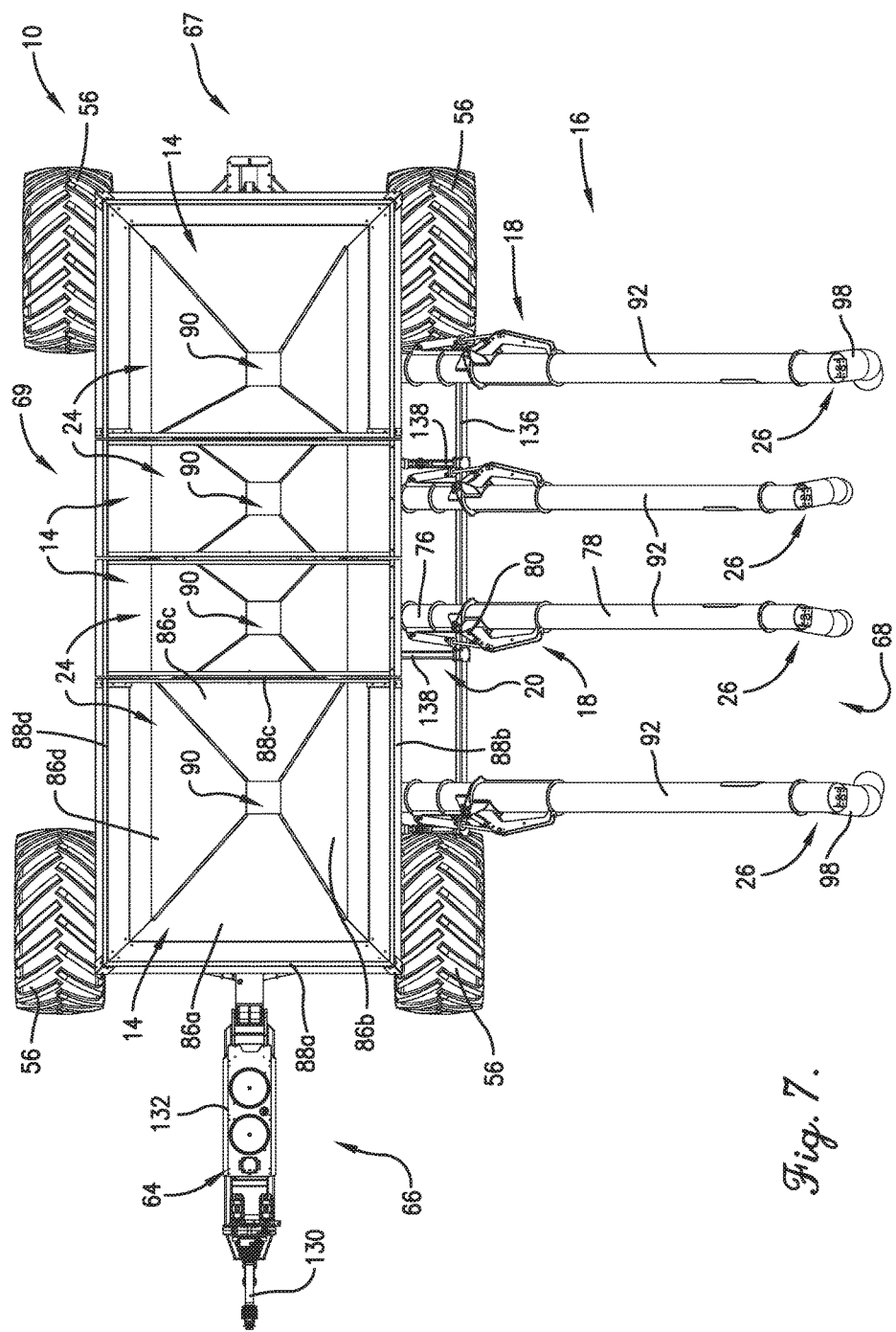
FIG. 7 is a top view of the vehicle of FIGS. 1-6, configured as an air cart tender and with the carriers in an elevated position.
Figure 8:
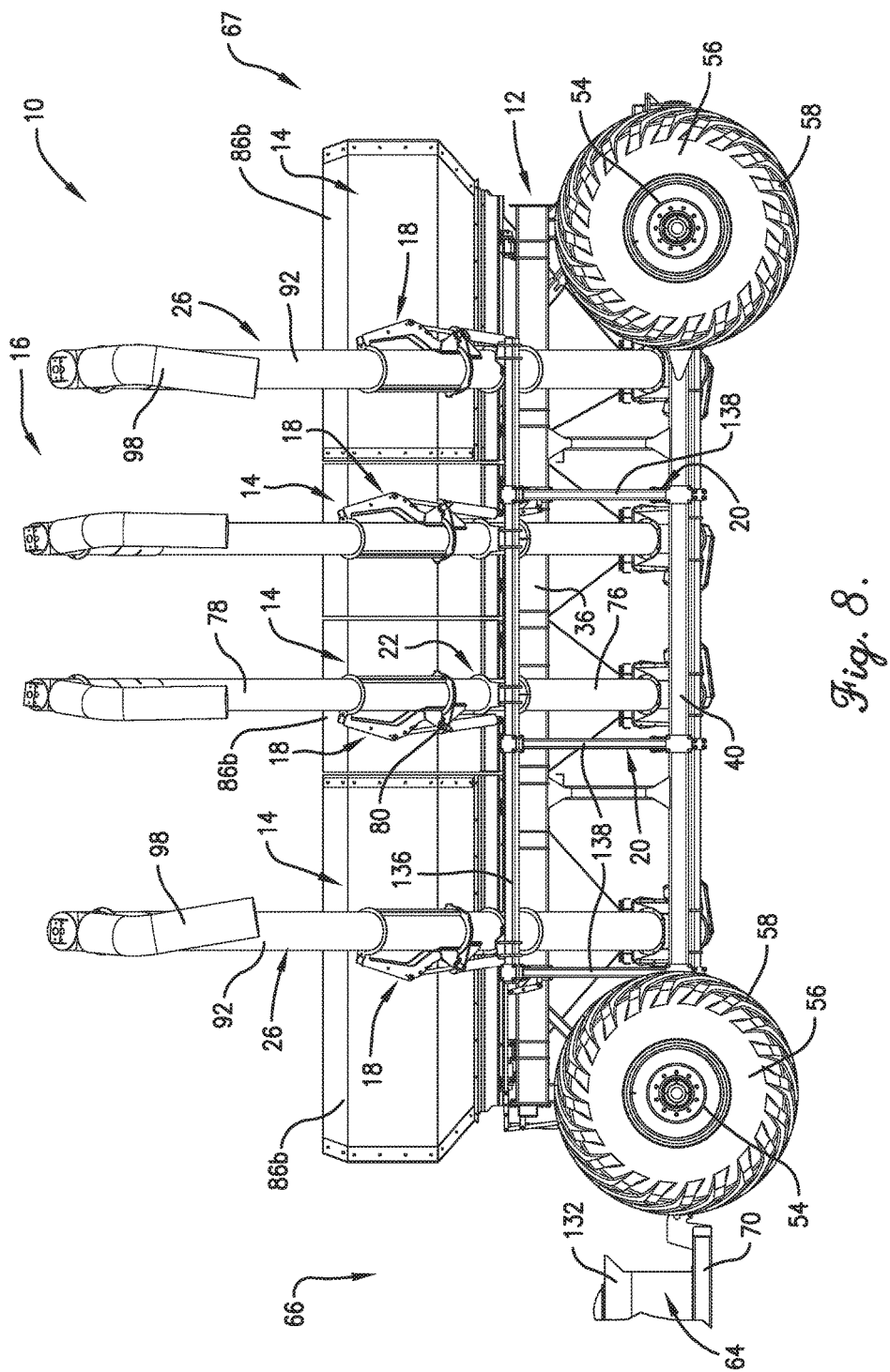
FIG. 8 is a side view of the vehicle of FIGS. 1-7, configured as an air cart tender and with the carriers in an elevated position.
Figure 9:
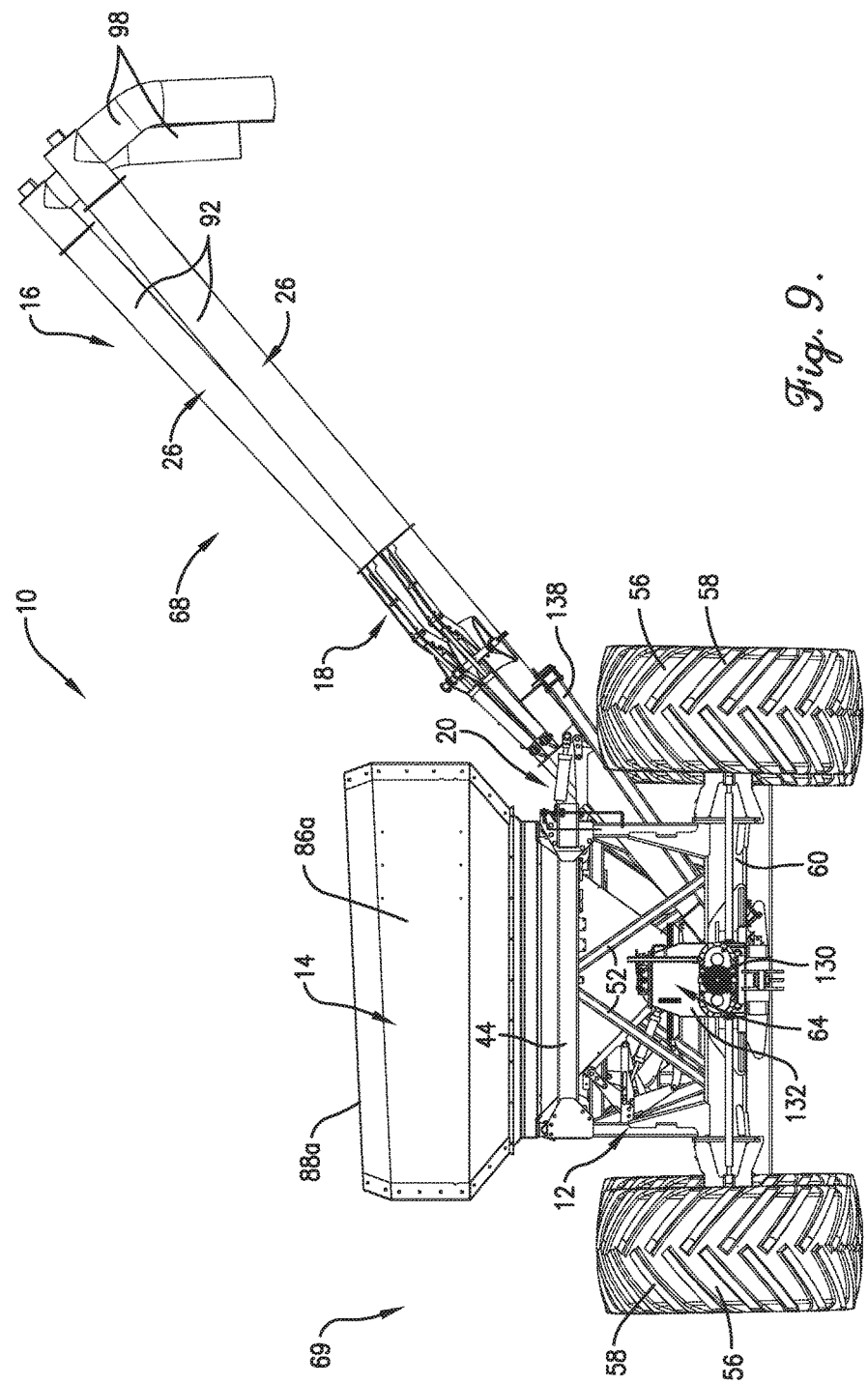
FIG. 9 is a front view of the vehicle of FIGS. 1-8, configured as an air cart tender and with the carriers in an elevated position.
Figure 10:
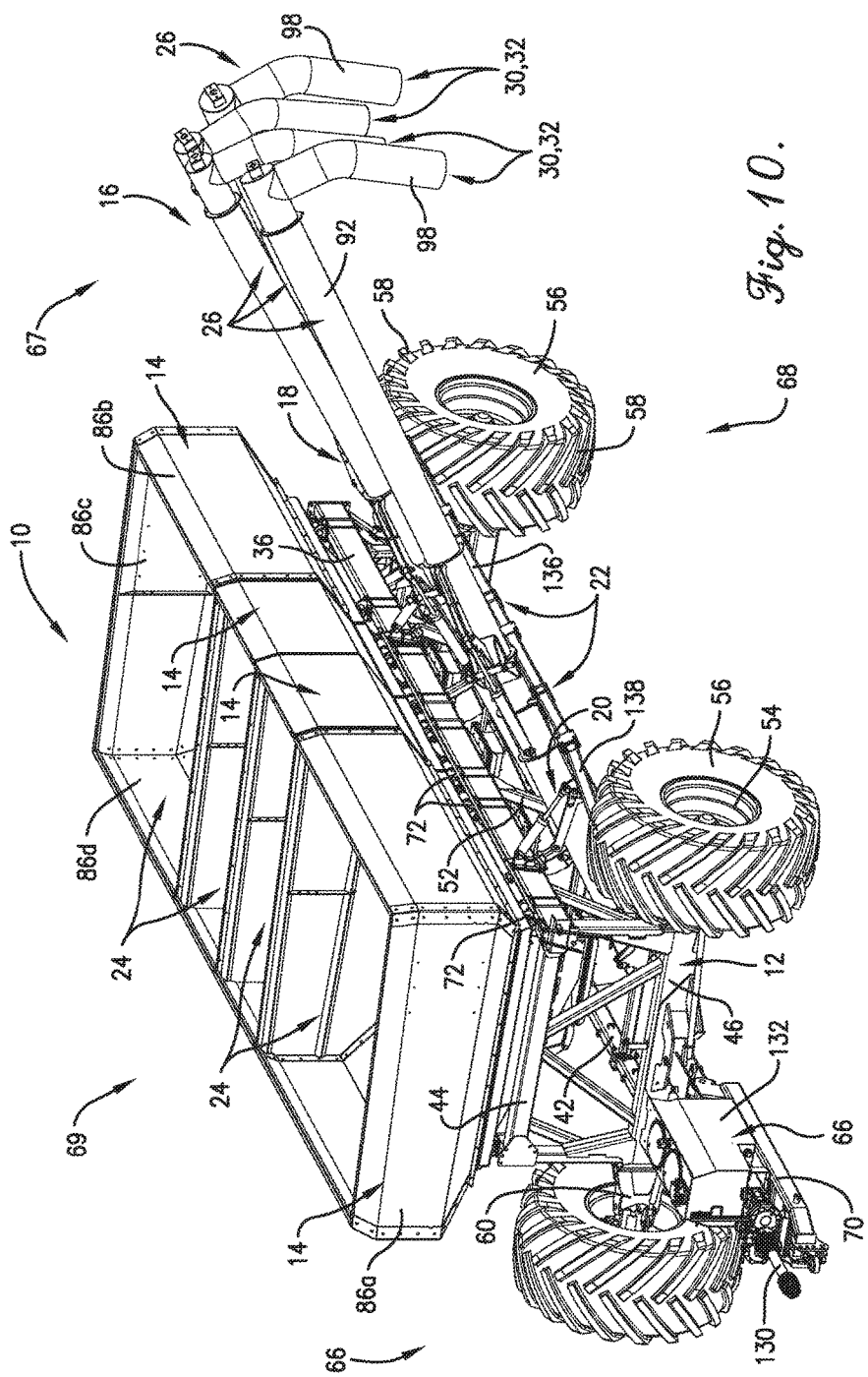
FIG. 10 is a front perspective view of the vehicle of FIGS. 1-9, configured as a grain cart and with the carriers in a lowered position.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Vehicle Overview

With initial reference to FIGS. 1-13, a configurable vehicle 10 is illustrated. Preferably, the vehicle 10 broadly includes a frame 12, a plurality of tanks 14 supported on the frame 12, an unloading system 16, a folding mechanism 18, a lifting mechanism 20, and a carrier positioning system 22.

Each of the tanks 14 preferably defines a tank interior 24 configured to house particulate (not shown). The particulate may be of any type, including but not limited to seeds, fertilizers, and/or grains. Furthermore, the tank interiors 24 may house the same type or different types of particulate. For instance, a first one of the tank interiors 24 might be at least in part filled with seed, while another one of the tank interiors 24 might be filled with a fertilizer. Alternatively, each of the tank interiors 24 might house harvested wheat or corn.

The tank interiors might also in some embodiments alternatively house a non-particulate good or material (e.g., a liquid).

It is further noted that the tank interiors might be filled simultaneously or independently in accordance with the desired application.

Although the size of the tanks 14 may vary without departing from some aspects of the present invention, it is preferred that the tanks 14 cooperatively be capable of housing from about five hundred (500) bushels of particulate to two thousand (2,000) bushels of particulate. More preferably, the tanks 14 are cooperatively capable of housing from about hundred (750) bushels of particulate to one thousand, five hundred (1,500) bushels of particulate. Most preferably, the tanks 14 are cooperatively capable of housing about one thousand (1,000) bushels of particulate. Preferably, the features of the vehicle 10 discussed herein enable unloading of the collective tanks 14 in less than ten (10) minutes. More preferably, the tanks 14 may cooperatively be unloaded in less than seven (7) minutes. Most preferably, the tanks 14 are cooperatively unloadable in about five (5) minutes.

The unloading system 16 preferably includes a plurality of individual carriers 26 and is preferably configured to unload the particulate from the tank interiors 24. As will be discussed in greater detail below, the lifting mechanism 20 and the carrier positioning system 22 each preferably enable adjustable positioning of the carriers 26 (e.g., by means of raising, lowering, and pivoting/fore-aft shifting).

Each of the carriers 26 preferably corresponds to one or more of the tanks 14. In the illustrated embodiment, for instance, each carrier 26 corresponds to a single one of the tanks 14. Each of the carriers 26 preferably defines an intake opening 28 for receiving particulate from the corresponding tank 14, a discharge opening 30 for dispensing particulate, and a particulate pathway 32 extending between and interconnecting the intake opening 28 and the discharge opening 30. Each carrier 26 preferably includes a conveying mechanism 34 for moving particulate along the pathway 32.

As will also be discussed in greater detail below, in the illustrated embodiment, each carrier 26 broadly comprises an auger assembly 26. However, it is permissible according to some aspects of the present invention for alternative carrier types to be used. For instance, the carriers might instead comprise belt-driven conveyors, or multiple carrier types might be provided on a single vehicle.

The frame 12 preferably presents a universal configuration not married to any one or more specific tank configurations. More particularly, the frame 12 preferably includes a pair of elongated, fore-and-aft extending, laterally spaced apart top frame rails 36,38; a pair of elongated, fore-and-aft extending, laterally spaced apart bottom frame rails 40,42; a pair of vertically spaced apart, laterally extending front rails 44,46 respectively extending between and interconnecting the top frame rails 36,38 and the bottom frame rails 40,42; and a pair of vertically spaced apart, laterally extending back frame rails 48,50 respectively extending between and interconnecting the top frame rails 36,38 and the bottom frame rails 40,42. The frame 12 additionally preferably includes a variety of struts 52 providing the frame 12 with additional structural rigidity.

The frame 12 is preferably mounted on wheels 54 and tires 56, although tracks, skis, or other structures may be provided to enable the vehicle to traverse desired terrain. Preferably, four (4) wheels 54 and corresponding tires 56 are provided, with one wheel 54 and one tire 56 located at each of the four (4) corners of the frame 12 such that the vehicle 10 exhibits a wide, balanced stance.

Such an arrangement preferably increases the stability of the vehicle 10 and beneficially distributes the load carried by the vehicle 10. For instance, the arrangement preferably provides good "floatation" of the vehicle over the terrain to be traversed, leading to decreased damage (e.g., compaction) to the terrain. The arrangement also increases ease of hauling by a motorized vehicle such as a tractor (not shown) by minimizing issues related to hitch loading (e.g., positive or negative tongue weight) that might arise in situations in which the tanks 14 are unevenly loaded due to disparities in the volume, type, density, and/or mass of particulate carried in some or all of the tanks 14.

Furthermore, the tires 56 each preferably include tread 58 that is configured to aid in floatation of the vehicle 10 by directing dislodged terrain (e.g., rocks or dirt) toward the circumferential center of the tire 56. It is also preferred that the tires 56 be relatively large, thereby providing additional cushioning to the frame 12 and aiding in floatation.

Although the above-described configuration is preferred, more or fewer wheels and tires might be provided without departing from the scope of the present invention, or four (4) wheels and tires might be provided but alternatively positioned.

Furthermore, the vehicle 10 might be configured to be self-powered rather than hauled.

In a preferred embodiment, the vehicle 10 includes front and rear axles 60 and 62, respectively. The front axle 60 is preferably generally rigid, while the rear axle 62 is preferably a walking pivot axle. The front axle 60 is also preferably steerable. Such features assist in enabling stable operation of the vehicle 10 over uneven terrain.

The vehicle 10 further preferably includes a stand-alone power takeoff (PTO)-driven pump assembly 64 that, as will be discussed in greater detail below, preferably provides pressurized fluid to enable hydraulic operation of at least the unloading system 16. The pump assembly 64 may perhaps additionally supply the lifting mechanism 20 and the folding mechanism 18. However, it is permissible for alternative means to be provided for operation of some or all of the unloading system, the lifting mechanism, and the folding mechanism. For instance, hydraulic power might be provided directly from a towing vehicle such as a tractor, or electric power might be provided. In another alternative, manual control might be required.

Preferably, the vehicle 10 defines a fore end 66 and an aft end 67 relative to a travel direction of the vehicle 10, thereby defining a fore-and-aft direction and a fore-aft axis therebetween. The vehicle 10 further preferably defines a carrier side 68, on which the carriers 26 extend, and an opposite side 69.

The pump assembly 64 is preferably supported on a pump mount 70 at the fore end 66 of the vehicle 10, although an alternative mounting location is permissible.

The vehicle 10 further preferably includes four (4) electric/hydraulic brakes (not shown). Alternative numbers of brakes and/or brake arrangements are permissible, however.

As noted above, the vehicle 10 preferably includes a plurality of tanks 14 supported on the frame 12. Each of the tanks 14 is preferably supported on the frame independently of one another. Furthermore, the frame 12 is preferably a standalone frame 12, such that the tanks 14 can be easily removed, replaced, rearranged, etc. in the frame 12. That is, the standalone nature of the frame 12 preferably enables tanks 14 of various shape and sizes to be efficiently mounted thereon. Furthermore, although the use of four (4) tanks as illustrated is preferred, more or fewer tanks may be mounted as necessitated by the particular usage of the vehicle. As will be discussed in greater detail below, such flexibility is highly advantageous in enabling use of the vehicle 10 in collaboration with other vehicles (including but not limited to agricultural vehicles such as air carts and semi-trailers) and devices (including but limited to agricultural devices such as grain baggers).

In a preferred configuration, as illustrated, the tanks 14 include two (2) larger tanks 14 and two (2) smaller tanks 14. The larger tanks 14 are preferably positioned at opposite fore and aft ends of the frame 12, with the smaller tanks 14 positioned between the larger tanks 14. Other arrangements are permissible, however.

Figure 14:
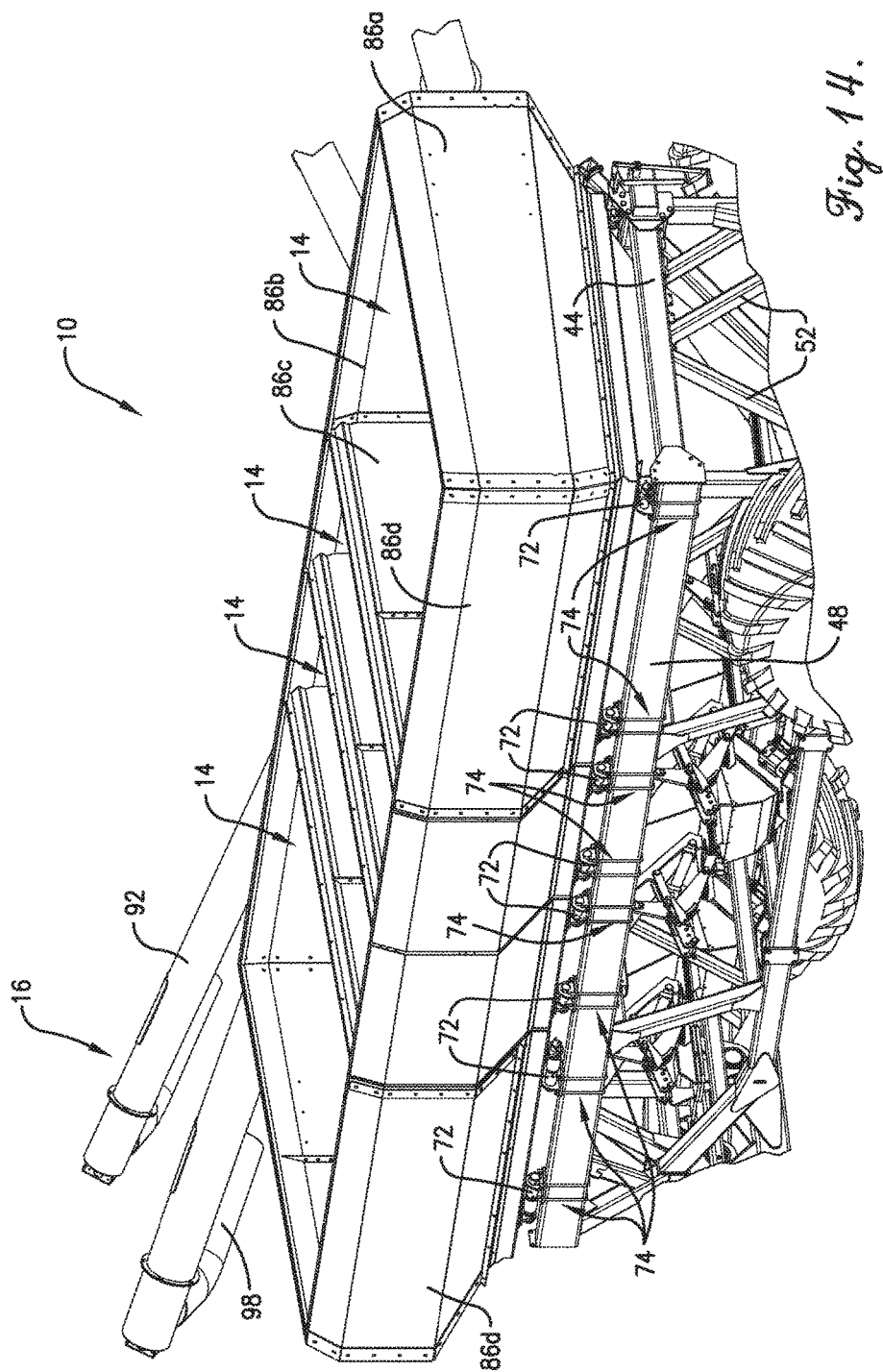
FIG. 14 is a fragmentary front perspective view of the vehicle of FIGS. 1-13, particularly illustrating the placement and support of the load cells.
Figure 15:
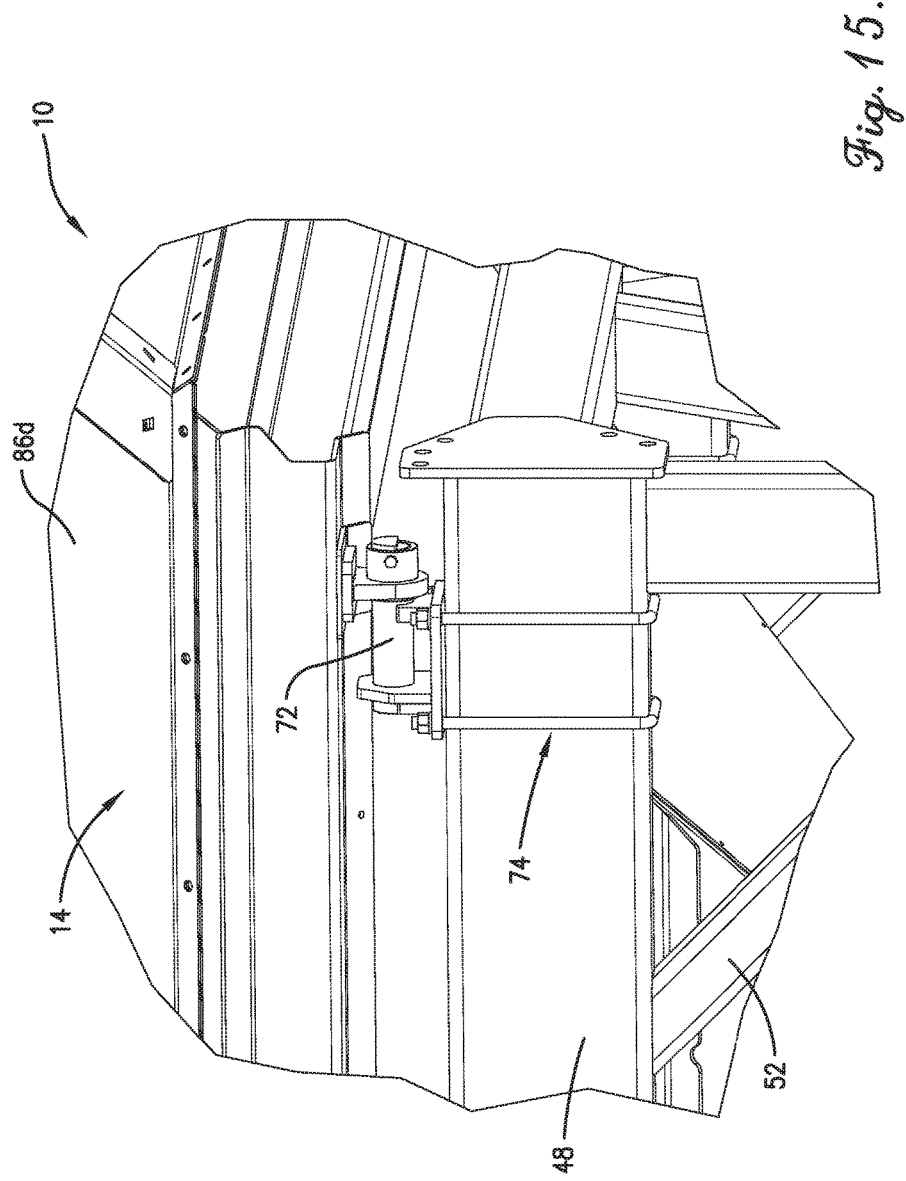
FIG. 15 is an enlarged, fragmentary view of a load cell as shown in FIG. 14.
Figure 16:
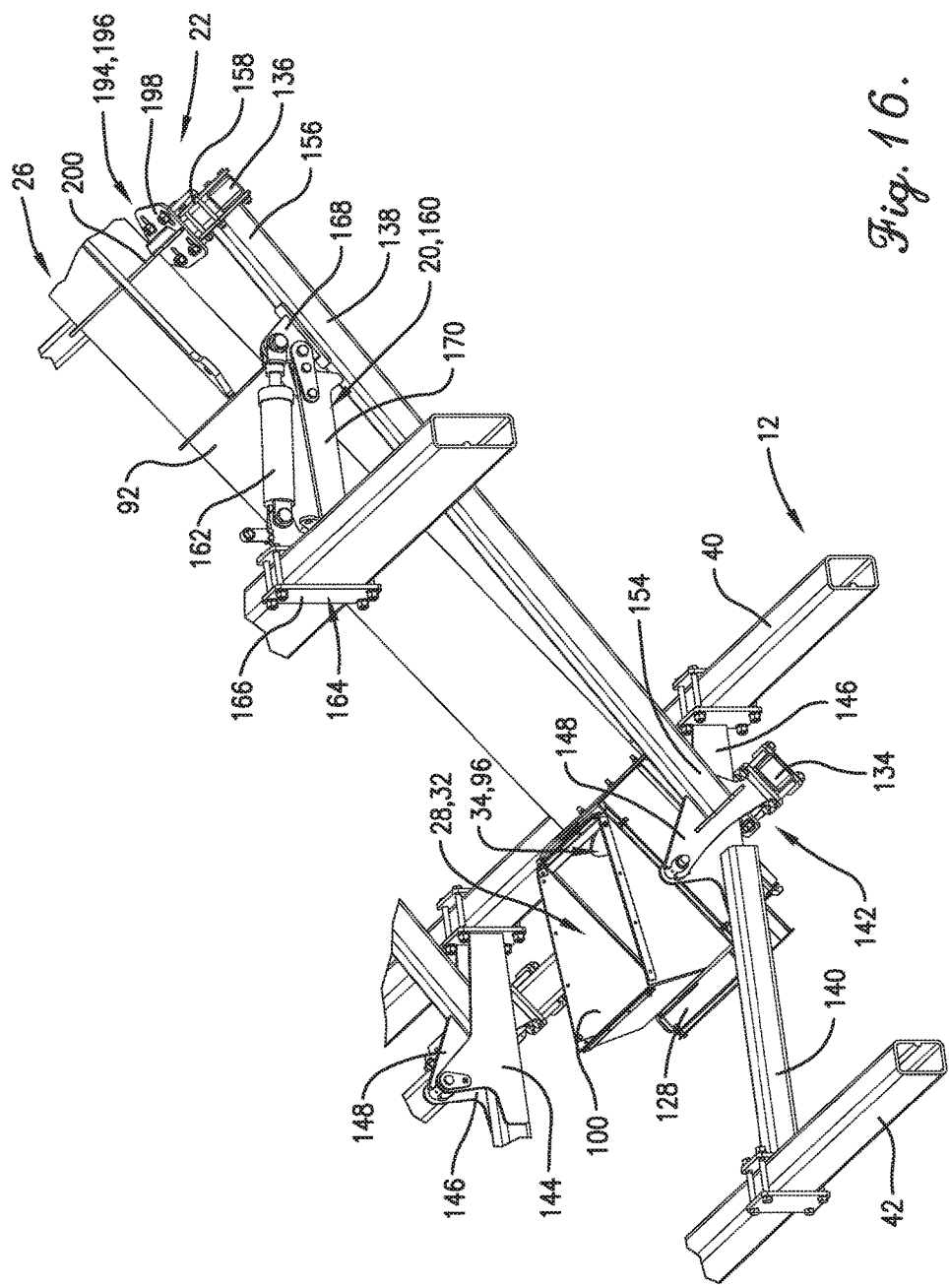
FIG. 16 is an enlarged top, front perspective view of part of the vehicle shown in FIGS. 1-14, particularly depicting one of the carriers in a raised position.
Figure 17:
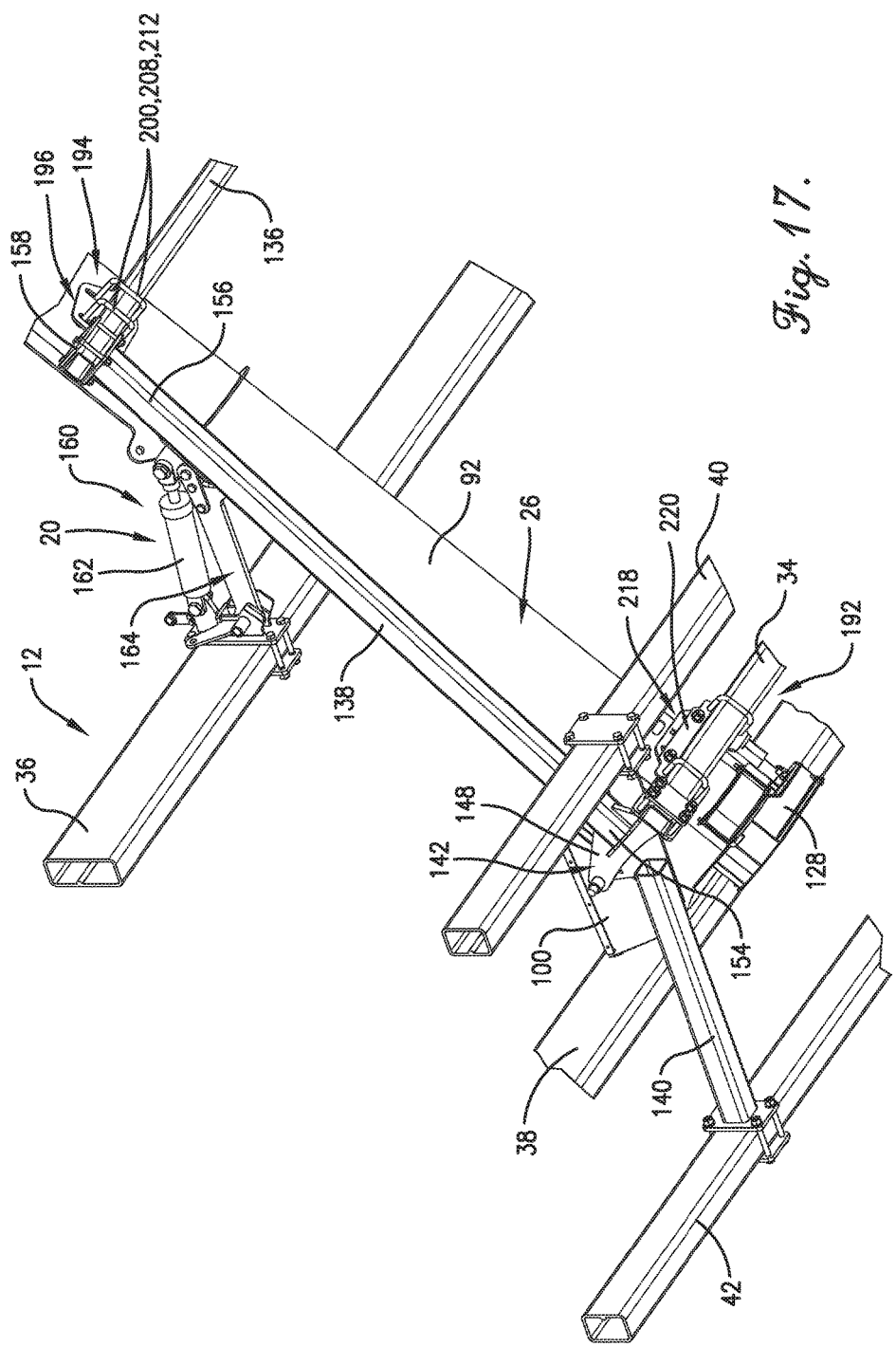
FIG. 17 is a bottom, front perspective view of the raised carrier of FIG. 16.
Figure 18:
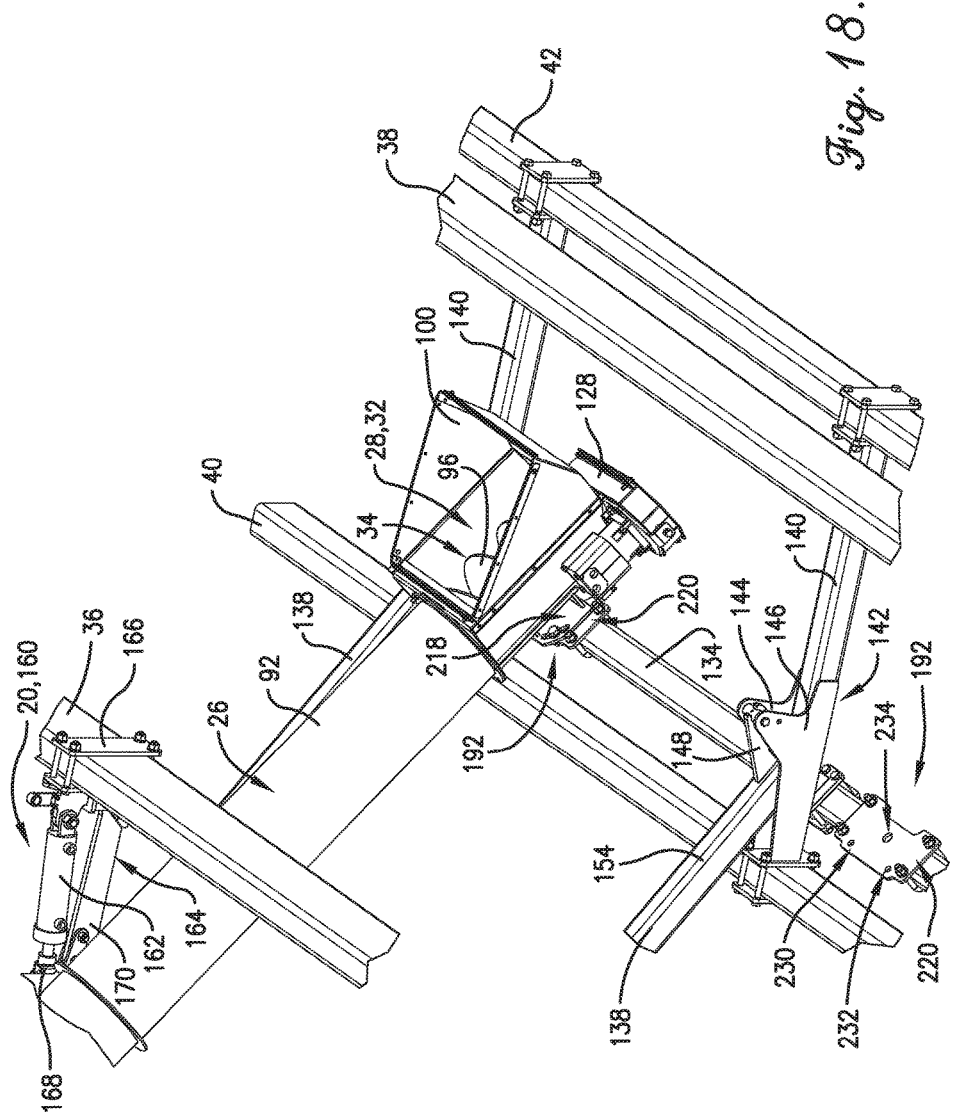
FIG. 18 is a top, rear perspective view of the raised carrier of FIGS. 16 and 17.
Figure 19:
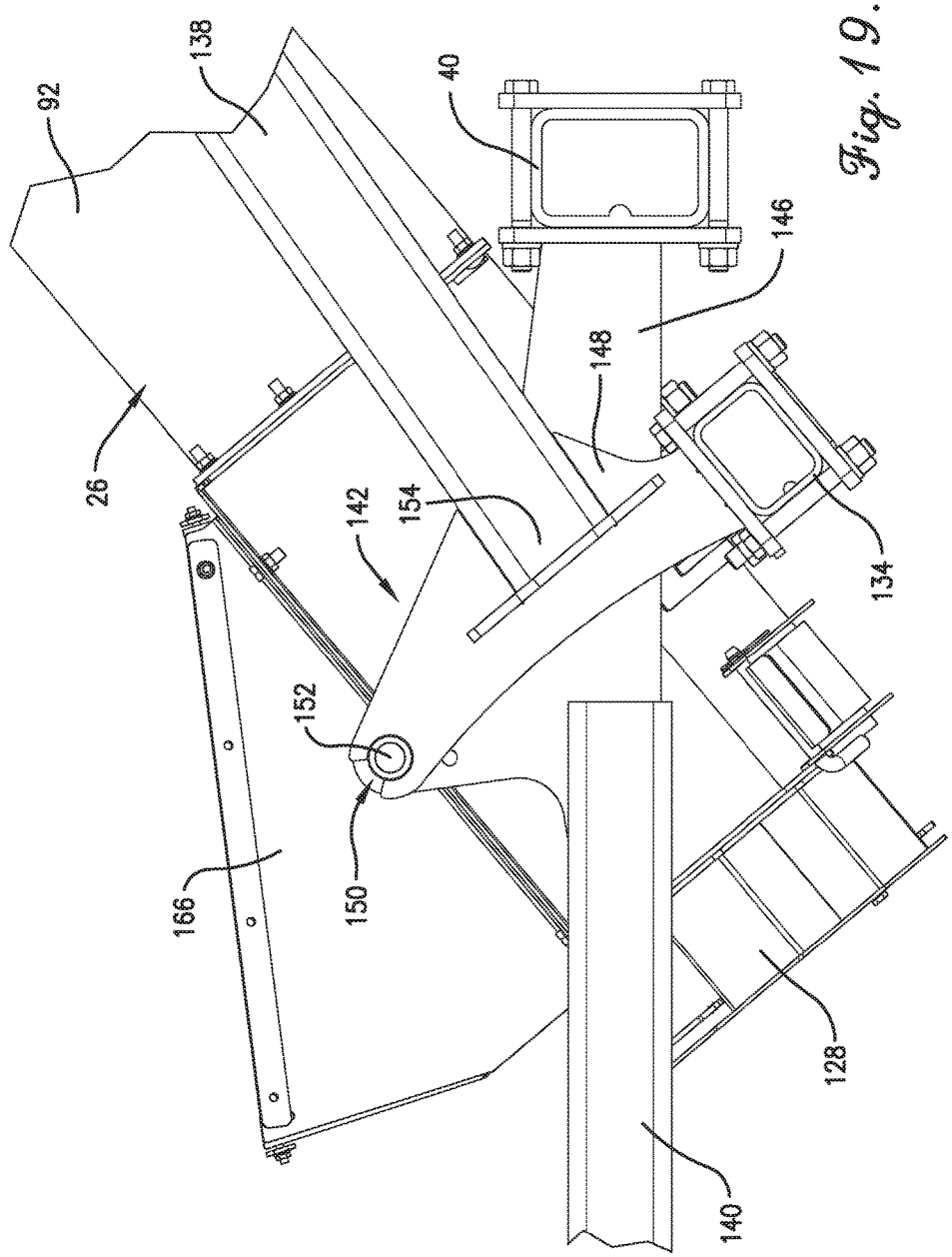
FIG. 19 is a further enlarged, fragmentary front view of a proximal portion of the raised carrier of FIGS. 16-18.
Figure 20:
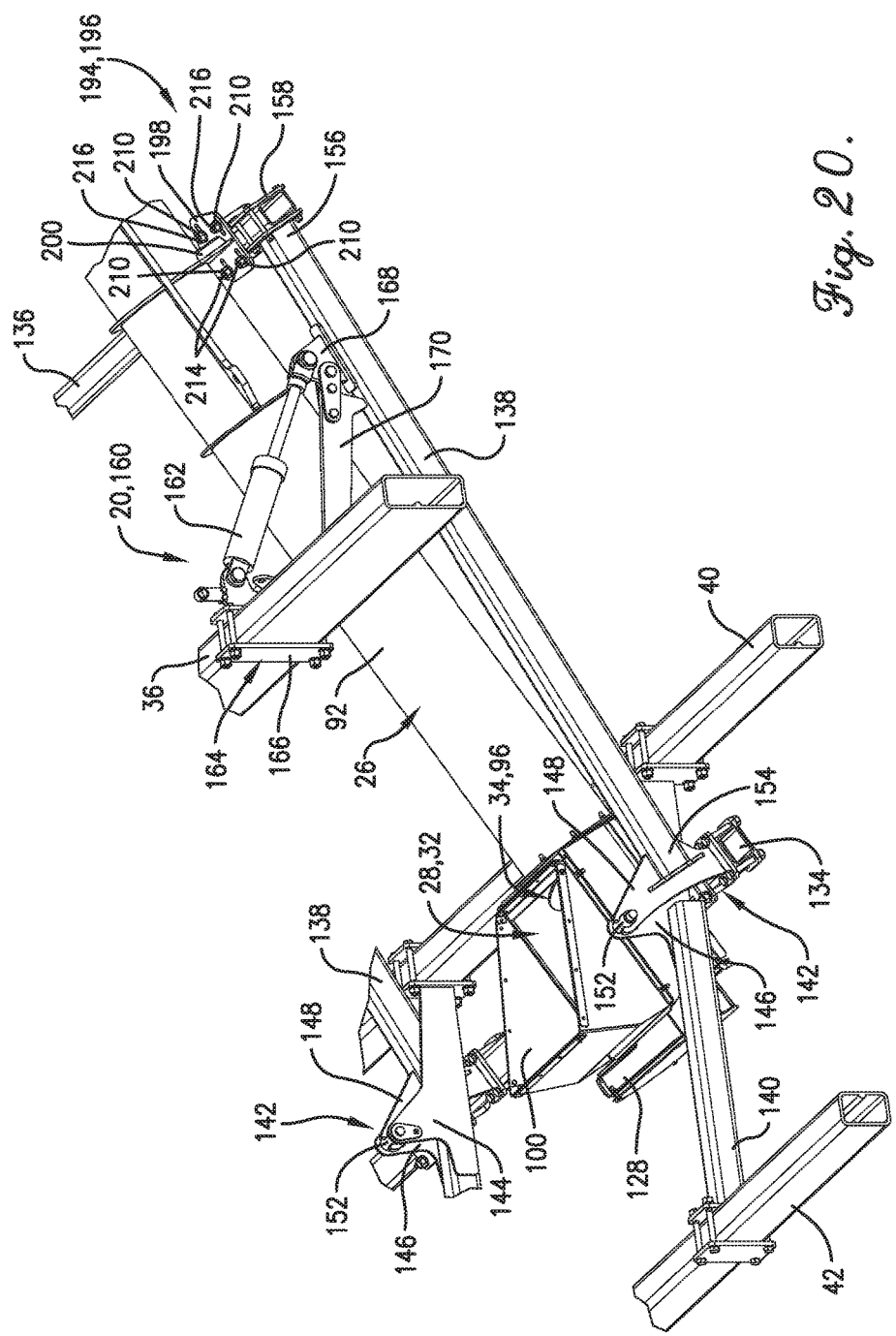
FIG. 20 is an enlarged top, front perspective view of part of the vehicle shown in FIGS. 1-14, particularly depicting one of the carriers in a lowered position.
Figure 21:
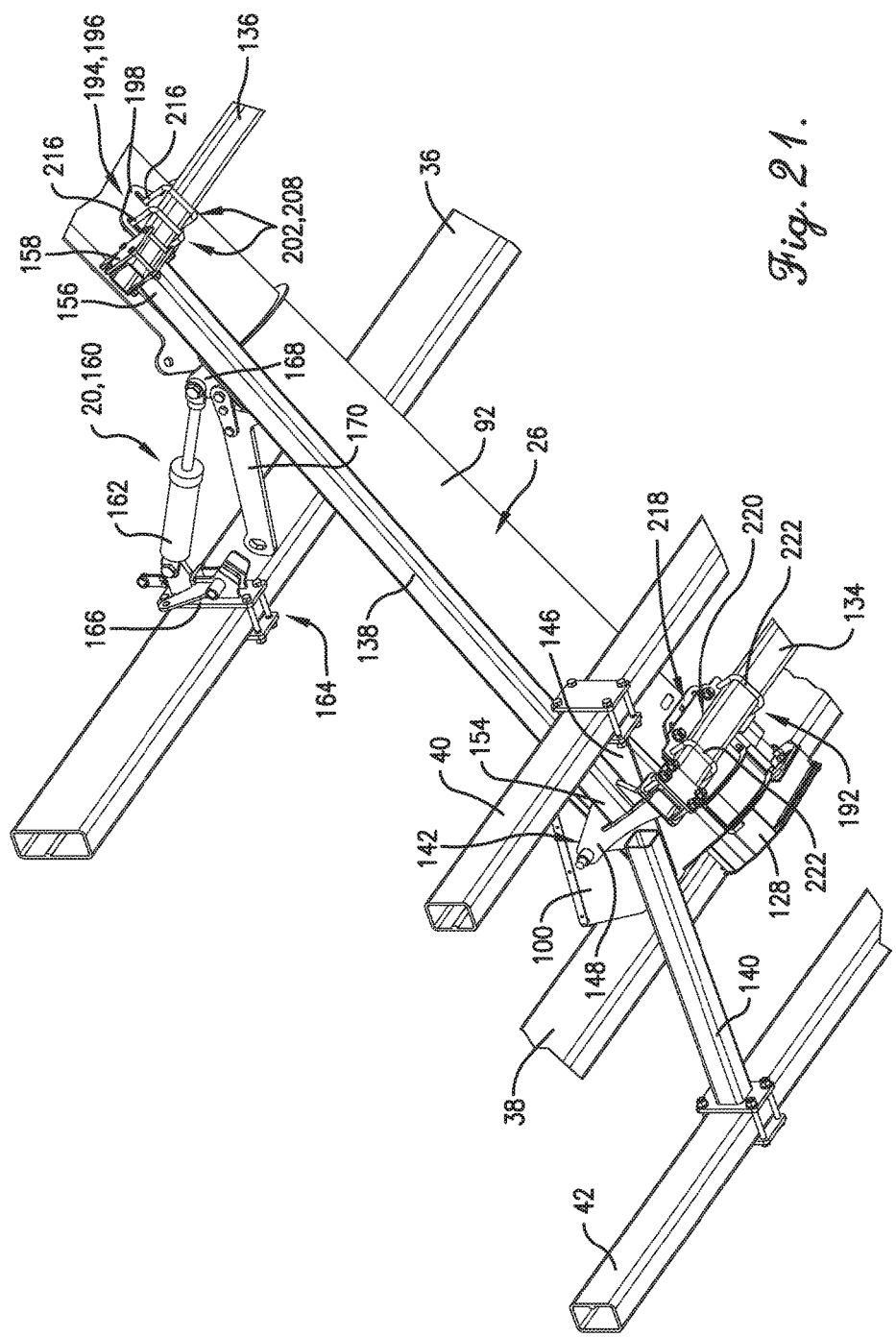
FIG. 21 is a bottom, front perspective view of the lowered carrier of FIG. 20.
Figure 22:
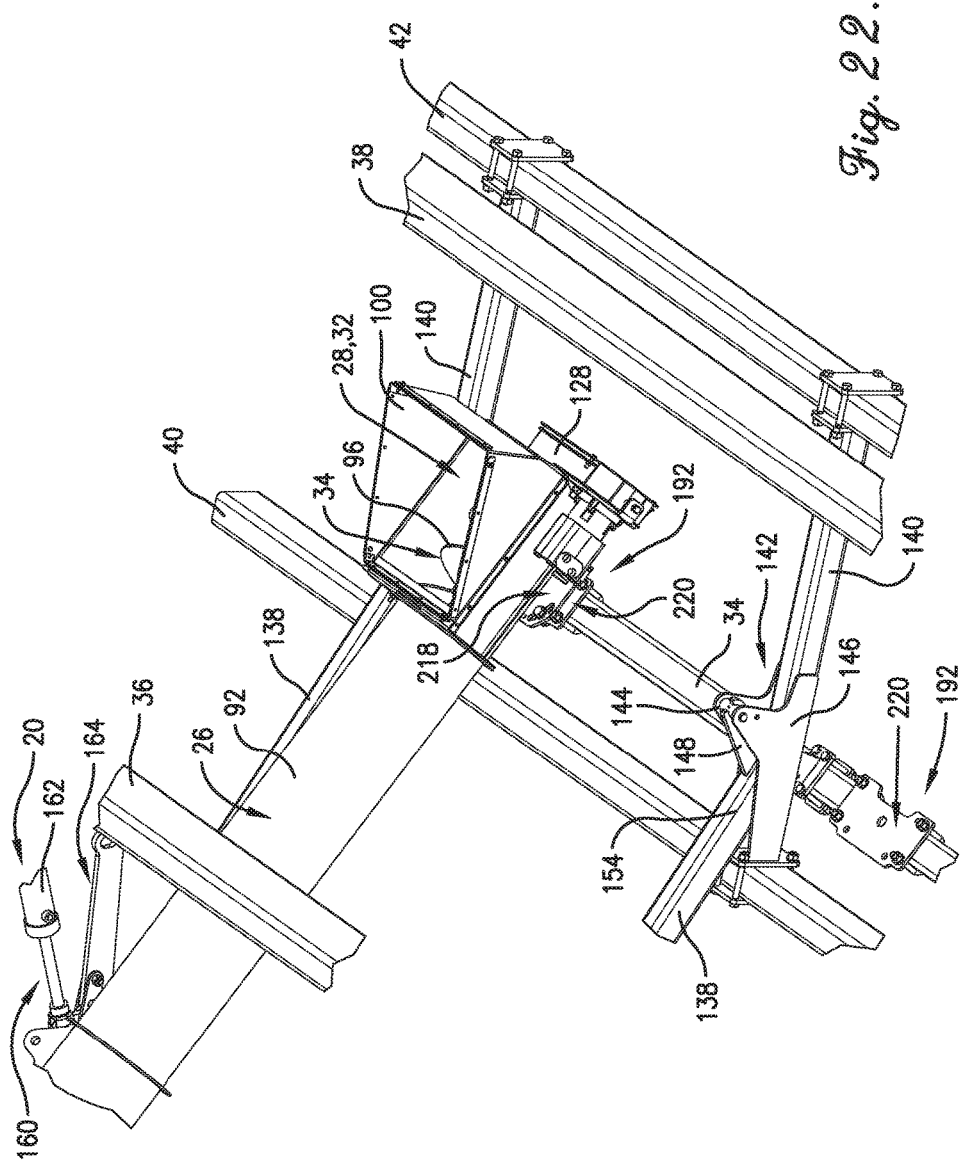
FIG. 22 is a top, rear perspective view of the lowered carrier of FIGS. 20 and 21.
Figure 23:
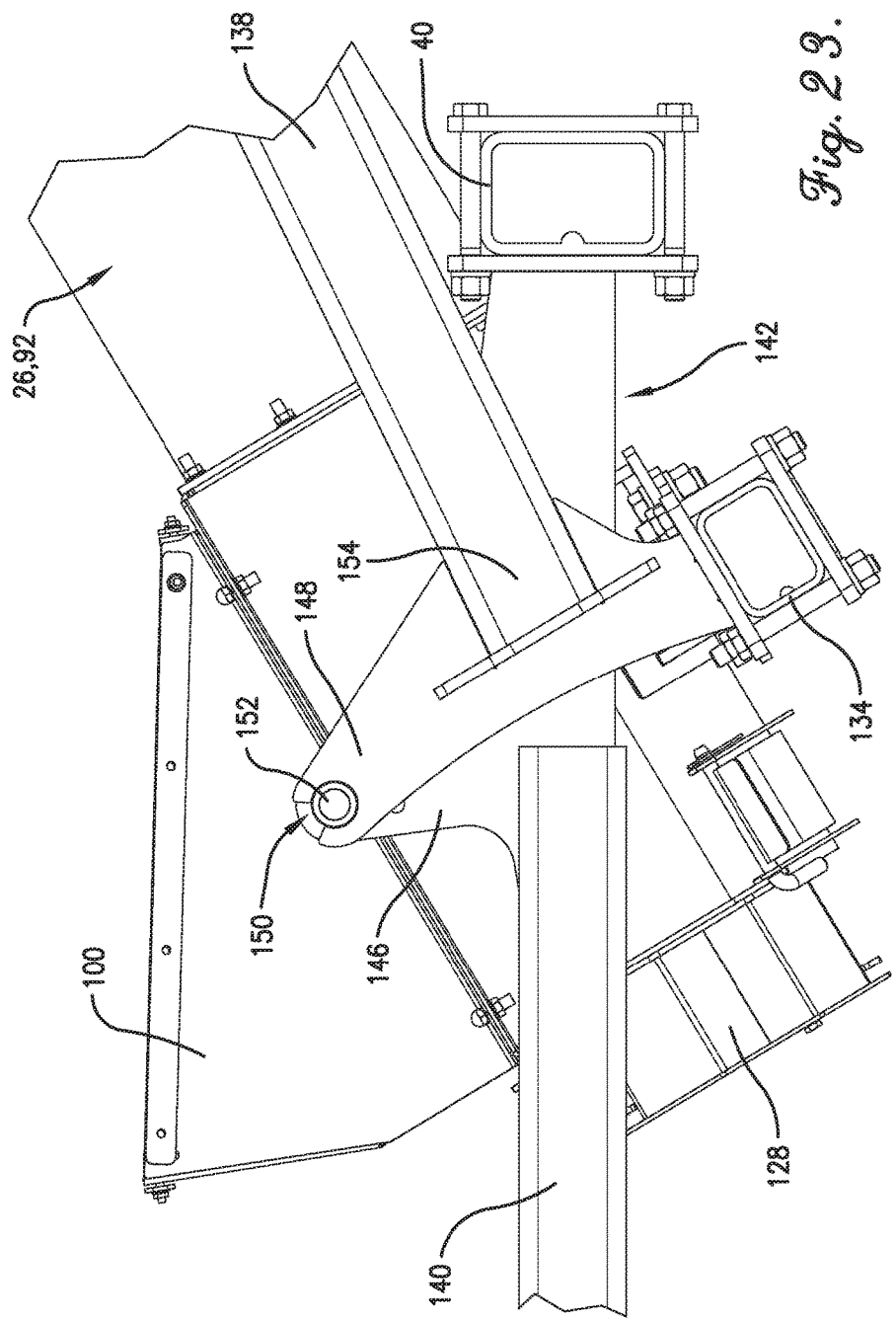
FIG. 23 is a further enlarged, fragmentary front view of a proximal portion of the lowered carrier of FIGS. 20-22.

In a preferred embodiment, the vehicle 10 further comprises a plurality of load cells 72 mounted to the frame 12 and corresponding to the tanks 14. More particularly, as best shown in FIGS. 14 and 15, the tanks 14 are preferably mounted to the frame 12 so as to engage the load cells 72. Preferably, four (4) mounting brackets 74 associated with four (4) load cells 72 are provided for each tank 14, with the mounting brackets 74 and the load cells 72 being positioned at the tank corners. This mounting style, coupled with the independent mounting of the carriers 26 so as to isolate the load cells 72 from the carriers 26, as discussed in greater detail below, enables the load cells 72 to accurately characterize (e.g, by weight) the amount of particulate housed in the corresponding tank interior 24.

Data from the load cells 72 might be displayed locally or remotely. For instance, in a remote display configuration, data might be presented on a display in proximity to an operator (e.g., in a tractor or on a mobile device) to enable either discrete (i.e., on-demand or continuous (i.e., real-time) monitoring. As will be discussed in greater detail below, such quantification may be advantageous during filling of the tanks 14, as well as during unloading thereof. For instance, the load cells 72 might provide information during filling of the tanks 14 to initiate manual or automatic stoppage of the fill process when a desired amount of particulate has been received or to provide a real-time or discrete record of received output from a filling source. Alternatively, the load cells 72 might provide information during unloading of the tanks to enable a controlled amount of particulate dispensation therefrom.

The load cells 72 are preferably in the form of load cell bars. However alternative load cell styles or sensor types might be provided. Furthermore, the load cells bars or alternatives might be positioned differently, or conventional mounting brackets (i.e., without load cells) may alternatively be used without departing from the scope of some aspects of the present invention.

Sample Vehicle Configurations

Several exemplary vehicle configurations are illustrated in FIGS. 1-13. For instance, FIGS. 1-5 illustrate a transport configuration, FIGS. 6-9 illustrate an air cart tender configuration, and FIGS. 10-15 illustrate a grain cart configuration. It is particularly noted, however, that the construction of the vehicle 10 enables its arrangement into any of a variety of configurations. That is, the example configurations discussed herein are in no manner exhaustive.

Furthermore, it is noted that the example configurations are initially presented herein in only a broad sense. That is, the devices, mechanisms, structures, and the like that enable the configurations are initially discussed only cursorily, with details being provided in later discussions of specific features and attributes.

Transport Configuration

With initial regard to the transport configuration illustrated in FIGS. 1-5, each of the carriers 26 preferably includes a proximal section 76 and a distal section 78 joined together at a hinge 80. The hinge 80 is preferably disposed at about half the length of the respective carrier, such that the proximal and distal sections 76 and 78, respectively, are approximately the same length. However, such geometric balance is not a necessary feature of the present invention.

Figure 24:
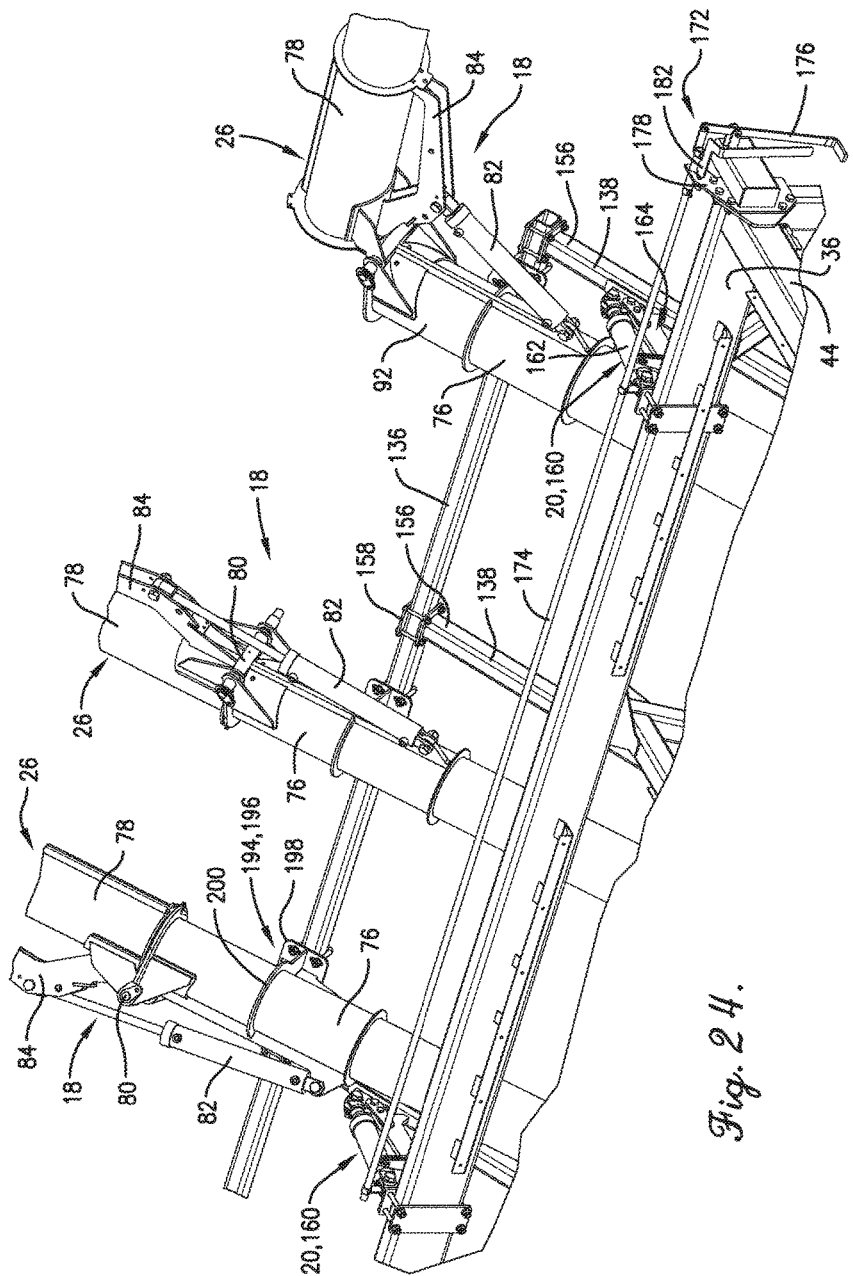
FIG. 24 is an enlarged, fragmentary front perspective view from a proximal vantage point of the vehicle of FIGS. 1-14, particularly illustrating the carrier locking mechanism with the carriers raised and the carrier locking mechanism locked.

A hydraulically driven folding mechanism 18 is preferably associated with the carriers 26. More particularly, as best shown in FIG. 24, the folding mechanism 18 preferably includes a plurality of hydraulic cylinders 82, with each hydraulic cylinder 82 associated with a respective one the carriers 26. (It is permissible, however, for multiple cylinders to be associated with a single carrier, or for a single cylinder to be associated with multiple carriers.) The hydraulic cylinder 82 is preferably fixed to the proximal section 76 of the carrier 26, and a bracket 84 is preferably secured to both the hydraulic cylinder 82 and the distal section 78 of the hydraulic carrier 26. Absent pressurization (or, more technically, absent significant pressurization), the hydraulic cylinder 82 is preferably retracted, such that the corresponding distal section 78 pivots about the hinge 80 so as to be folded at least substantially flush against or generally alongside a corresponding one or more of the tanks 14. Sufficient pressurization of the cylinder 82, in contrast, results in opposite pivoting of the distal section 78 about the hinge 80 so as to at least substantially align with the proximal section 76 (see, for instance, FIGS. 6-15). That is, pressurization of the cylinder 82 results in unfolding of the corresponding carrier 26.

Preferably, the foremost two (2) carriers 26 fold forward, whereas the rearmost or aftmost two (2) carriers 26 fold backward. However, other folding directions are permissible.

Operation of the hydraulic cylinders 82 preferably occurs in a coordinated manner (e.g., simultaneously/synchronized or in a predetermined discrete or overlapping sequence) upon activation of the folding mechanism 18 to maximize the efficiency of folding and unfolding operations. Independent operation is permissible, as well. Most preferably, however, in a folding operation, the two (2) outermost ones of the carriers 26 fold down first, followed by the two (2) innermost ones of the carriers 26. In an unfolding operation, it is preferred that the two (2) innermost ones of the carriers 26 unfold first, followed by the two (2) outermost ones of the carriers 26.

Furthermore, operation of the fold/unfold function is preferably remotely controllable. For instance, in a preferred embodiment, a wireless remote control system (not shown) is provided for operation of the fold/unfold function, enabling an operator to have full control of the function from the ground, from the top of the vehicle 10, from the cab of a tractor or other towing vehicle, etc. However, other control means also fall within the scope of the present invention.

As also shown in FIGS. 1-5, the transport configuration is also characterized by a raised configuration of the carriers 26 and, preferably, by a locking of the carriers into a raised position. Details of the raised configuration and structure enabling it, as well as of the locking mechanism, are discussed below.

It is noted that the "folded" transport position is particularly advantageous during transport of the vehicle 10 when subject to lateral space constraints (e.g, as when traveling down a road).

Air Cart Tender Configuration

As noted previously, FIGS. 6-9 illustrate an air cart tender configuration. More particularly, similarly to the transport configuration, the carriers 26 are preferably raised or elevated. However, rather than being folded, the carriers 26 are preferably fully extended via pressurization of the corresponding hydraulic cylinders 82 and consequent substantial alignment of the proximal and distal sections 76 and 78, respectively.

Furthermore, in the illustrated air cart tender configuration, each of the carriers 26 preferably extends generally perpendicularly relative to the vehicle fore-aft axis. That is, in more general terms, the carriers 26 each extend straight out from the side of the vehicle 10, with each of the carriers 26 thereby being parallel to one another. Still further, the carriers 26 are each preferably aligned with a respective one of the tanks 14.

Such a configuration may be particularly advantageous in situations in which the vehicle 10 plays a support role to a second vehicle that is preferably similarly configured. For instance, the illustrated configuration of FIGS. 6-9 is optimized for use of the vehicle 10 as an air cart tender for filling and/or re-filling an air seeder (not shown) having four (4) similarly sized and positioned tanks.

More particularly, while the air seeder is in operation in a field, the vehicle 10 in the transport configuration might be towed by a tractor to a particulate supply positioned at or beyond the periphery of the field, where the tanks 14 are filled with the appropriate particulate. The load cells 72 might provide data indicating the amount of particulate that has been received to ensure appropriate loading.

The vehicle 10 might then be towed back to the field, adjacent the air seeder, and reconfigured such that the discharge openings 30 of the carriers 26 are aligned with openings in the tanks of the air seeder—i.e., the air cart tender configuration. In the illustrated configuration, such alignment is achieved by carriers 26 extending perpendicularly to the frame 12 and in an elevated position, although both components of positioning may be adjusted as required to achieve coordination with the tanks or the particular air seeder being tended. (Details of how such positioning occurs are provided below.)

Particulate may then be transferred to the air cart tanks from the tanks 14. The carriers 26 might all operate simultaneously to unload the particulate from the respective ones of the tanks 14, or the carriers 26 might be operated individually or in sets. The load cells 72 might again provide data, this time indicating how much seed, fertilizer, etc. has been unloaded to the seeder. This data might be used to initiate either automatic shut-off or manual shut-off of the unloading process.

Grain Cart Configuration

An exemplary grain cart configuration is shown in FIGS. 10-15. More particularly, similarly to the air cart tender configuration, the carriers 26 are preferably fully extended via pressurization of the corresponding hydraulic cylinders 82 and consequent substantial alignment of the proximal and distal sections 76 and 78, respectively. However, in contrast to the air cart tender configuration, the carriers 26 are in a lowered position.

Furthermore, in the illustrated grain cart configuration, each of the carriers 26 extends toward a central point such that the discharge openings 30 are at least substantially immediately adjacent one another. That is, in more general terms, the carriers 26 extend at varying angles relative to the frame 12 so as to converge with one another. Such arrangement enables formation of a centralized or concentrated particulate stream, comprising particulate from multiple ones of the tanks 14 and carriers 26, during unloading.

Such a configuration may be particularly advantageous in situations in which the vehicle 10 plays a support role to a second vehicle that is preferably differently configured. For instance, the illustrated configuration of FIGS. 10-15 is optimized for use of the vehicle 10 as a grain cart for receiving grain from a combine harvester (not shown), transporting the grain to a semi-trailer (e.g., a "Super B" or "B-train" trailer), and filling the trailer.

More particularly, while the combine harvester is in operation in a field, the vehicle 10 in the transport configuration might be towed alongside the combine harvester by a tractor so as to receive harvested grain from the combine either concurrently with harvesting (i.e., with both the combine harvester and the vehicle 10 in motion) or with both vehicles stopped. The tractor might then haul the vehicle 10 to a remote (e.g., at the edge of the field) semi-trailer. The vehicle might then be reconfigured into the grain cart configuration and the particulate unloaded therefrom into the semi-trailer, with the centralized stream of particulate provided by the clustered discharge openings 30 of the preferably simultaneously operating carriers 26 being conducive to efficient and controlled filling of the semi-trailer.

A configuration with carriers 26 converged as illustrated in FIGS. 10-15 is also conducive toward unloading of harvested crop into a grain bagging system, rather than a semi-trailer or other vehicle.

Furthermore, it is particularly noted that unloading into a semi-trailer with the carriers 26 alternatively extended so as to not converge (e.g., in a parallel configuration similar to that shown with respect to the air cart tender configuration)

is of course also permissible, with such an arrangement being conducive toward even distribution of the particulate in the semi-trailer.

The load cells 72 might provided data both during loading of the vehicle 10 by the combine harvester and during discharge into the semi-trailer. For instance, the load cells 72 might provide particulate weights during filling of the tanks 14 from the combine harvester, then track output into the semi-trailer to provide crop harvest data.

Figure 11:
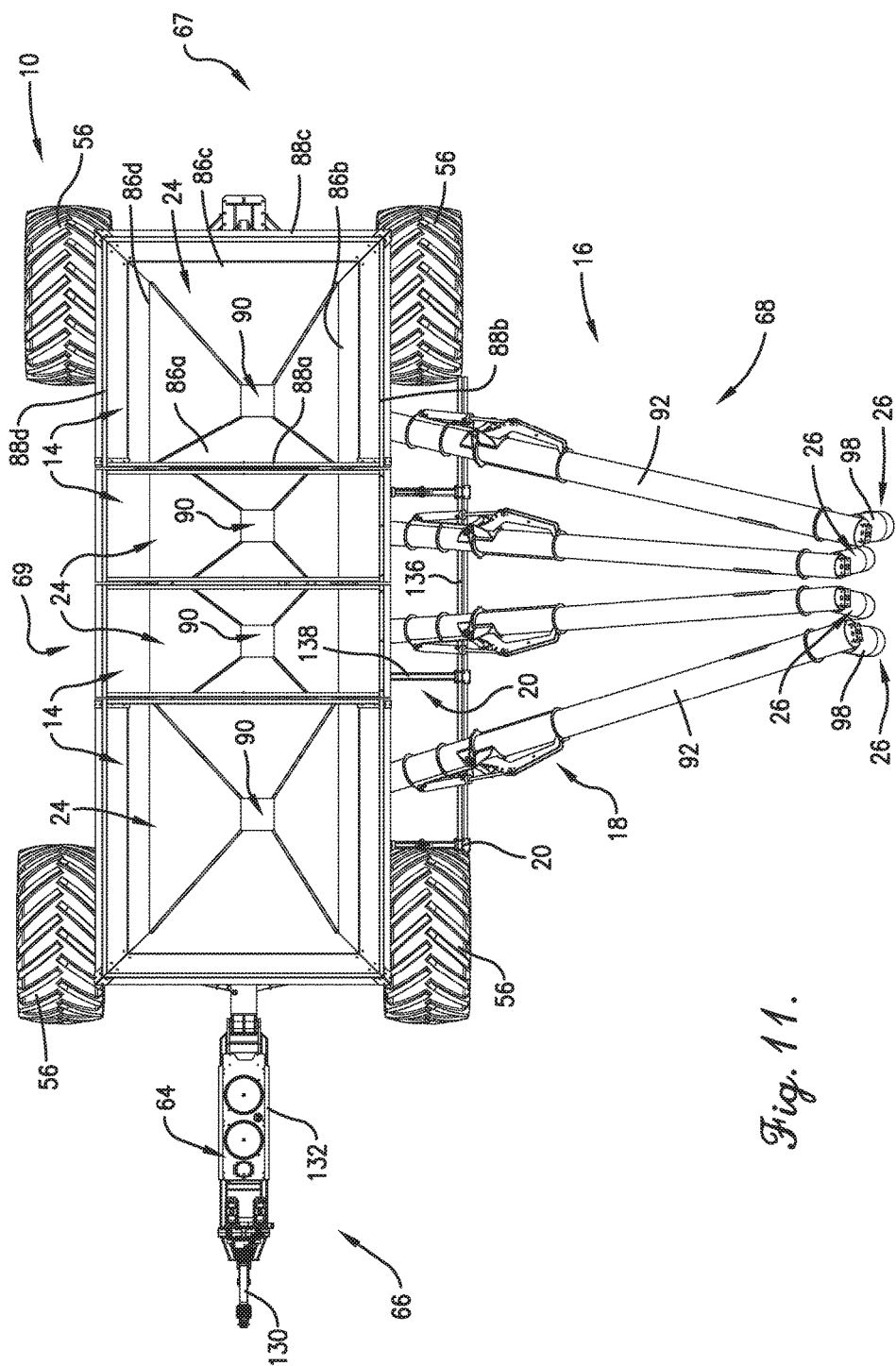
FIG. 11 is a top view of the vehicle of FIGS. 1-10, configured as a grain cart and with the carriers in a lowered position.
Figure 12:
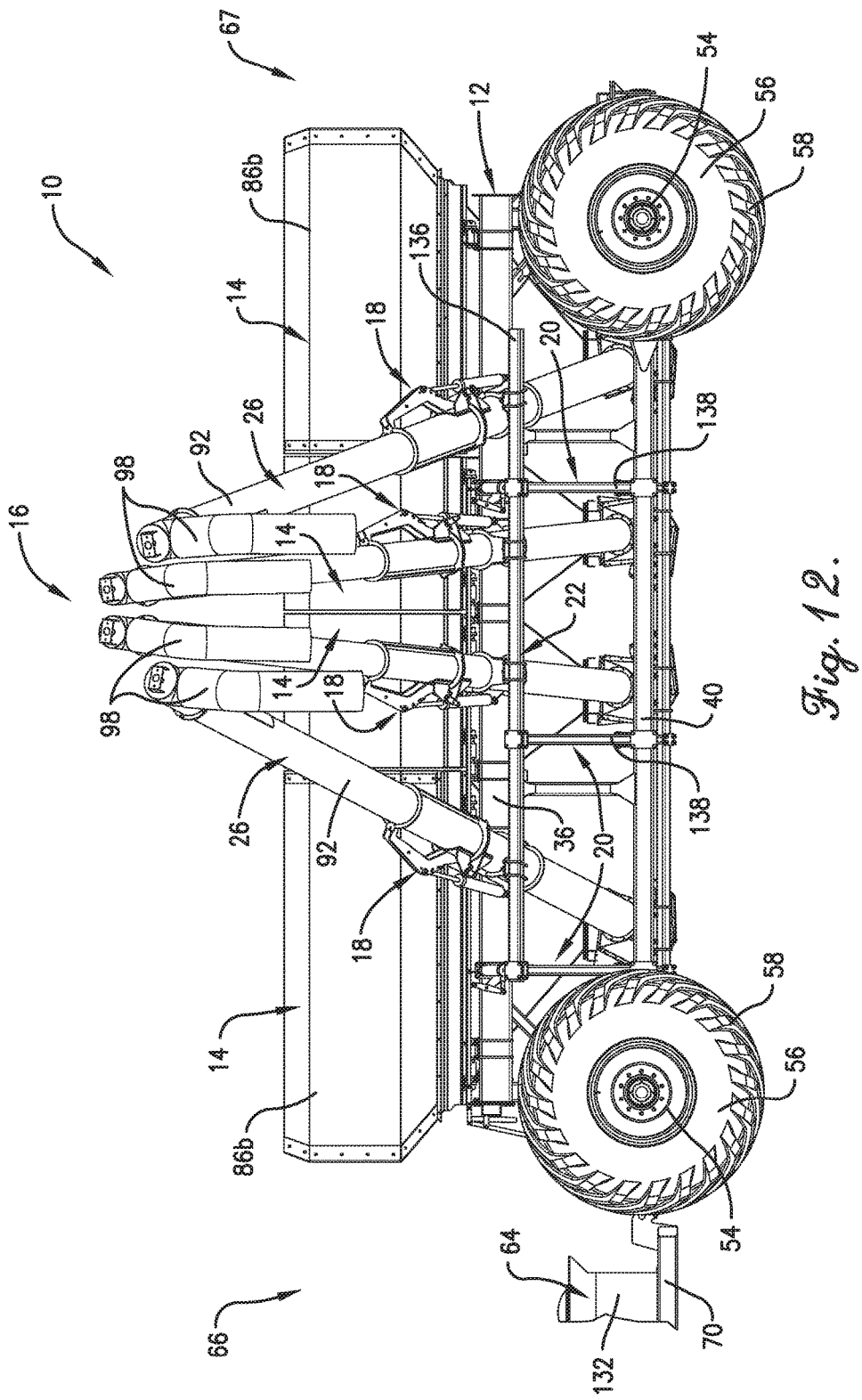
FIG. 12 is a side view of the vehicle of FIGS. 1-11, configured as a grain cart and with the carriers in a lowered position.
Figure 13:
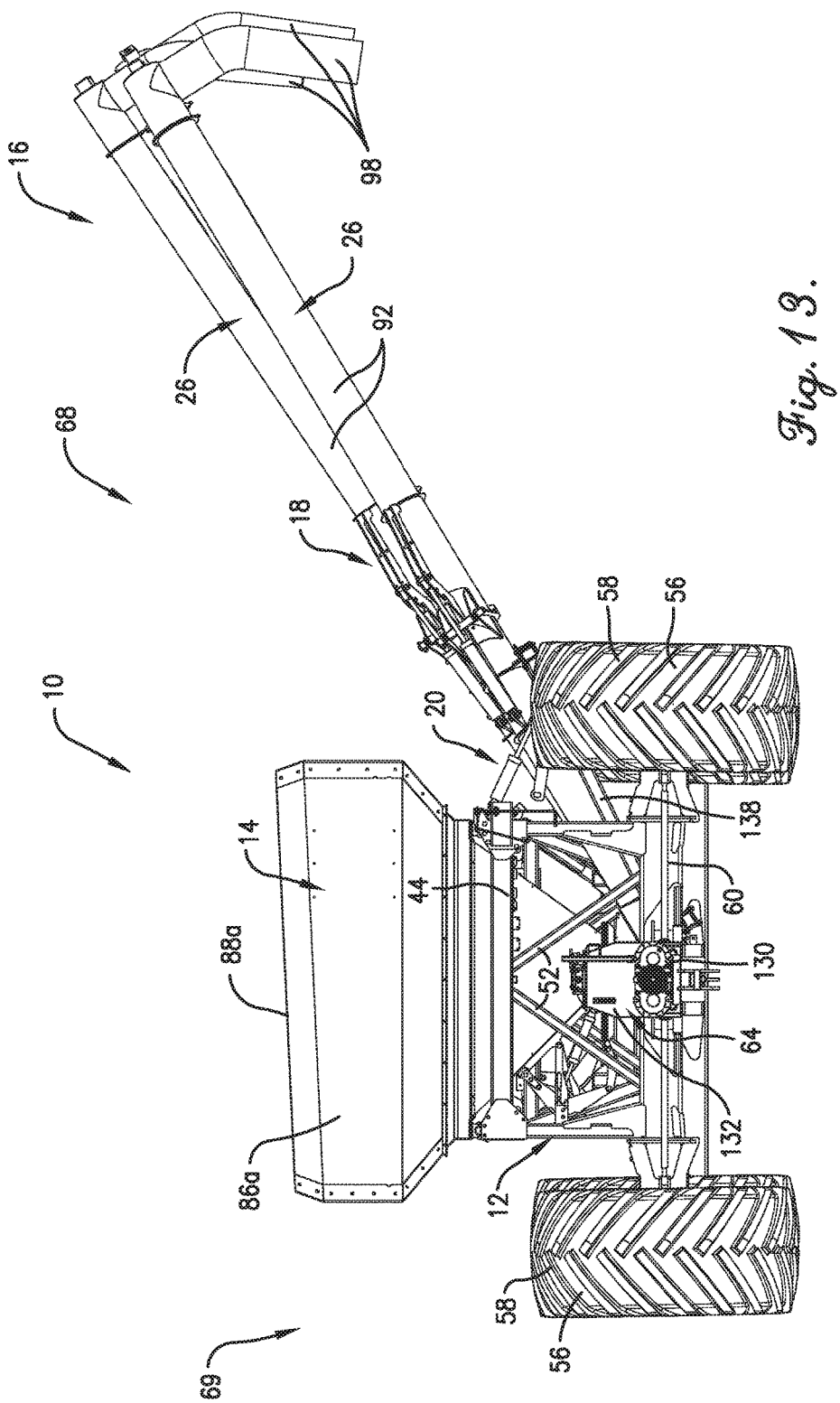
FIG. 13 is a front view of the vehicle of FIGS. 1-12, configured as a grain cart and with the carriers in a lowered position.

Each tank 14 preferably includes a plurality of sides 86a-d defining top edges 88a-d. The sides 86a-d additionally cooperatively define a tank outlet 90. As best shown in FIGS. 3 and 5, 7 and 9, and 11 and 13, the tanks 14 are preferably "biased" toward the carrier side 68 of the vehicle 10. More particularly, as best shown in FIG. 11, the tank outlets 90 are shifted laterally relative to the fore-and-aft axis of the vehicle 10 so as to be positioned closer to the carrier side 26 thereof. Such shifting is dictated by the unequal sloping of the sides 86b and 86d. Furthermore, the top edges 86a and 86c are biased to the carrier side 26 of the vehicle 10. More particularly, the top edges 86a and 86c cooperatively slope upwardly toward the carrier side 26. Such geometric features of the tanks 14 are particularly advantageous in the grain cart configuration, enabling easier positioning and operation of an unloading auger from the combine harvester into the vehicle 10, as well as providing improved visibility into the tanks 14 during the operation.

It is also noted that some or all of the tank outlets 90 may be offset in a fore-and-aft direction relative to the corresponding tank interiors 24, as illustrated.

Unloading System

In a preferred embodiment, as noted previously, each carrier 26 preferably broadly comprises an auger assembly 26, although other carrier types, including but not limited to chain, belt, and/or paddle based conveyors, may be used. The auger assembly 26 preferably includes an auger 34, which serves as the conveying mechanism 34, and a conduit 92 that at least substantially houses the auger 34 and defines the aforementioned intake opening 28.

The auger 34 preferably includes a main shaft (not shown) and flights or flighting 96 helically encircling the shaft 96, although a shaftless auger is permissible. The conduit 92 is preferably in the form of a cylindrical tube that circumscribes the flighting 96. However, the conduit 92 might be non-circular in cross-section, only partially circumscribe the flighting, or be alternatively configured in some other manner.

The auger assembly 26 further preferably includes a discharge spout or chute 98 shiftably fixed to a distal end of the conduit 92. The chute 98 preferably defines the discharge opening 30 and is configured to guide particulate dispensed from the chute 98 to the final target. Thus, the conduit 92 and chute 98 preferably cooperatively at least in part define the particulate pathway 32.

More particularly, each chute 98 preferably extends generally orthogonally relative to the corresponding conduit 92 and is rotatable generally in a plane orthogonal to the conduit 92. One of ordinary skill in the art will recognize that such rotatability during an unloading operation corresponds largely to fore-and-aft shiftability and enables improved alignment of the chute 98 with a target (i.e., an air seeder tank opening, a grain bagger, or a semi-trailer).

Although the use of chutes 98 is preferred to enable increased flexibility in positioning of the discharge openings 30, it is permissible according to some aspects of the present invention for the carriers 26 to be devoid of chutes. For instance, the conduits themselves might define the discharge openings.

Each auger assembly 26 also preferably includes a generally rigid intake adapter 100 connected to the conduit 92 adjacent the intake opening 28. The intake adapter 100 preferably receives particulate from the corresponding tank 14 and funnels or otherwise directs it to the intake opening 28.

The unloading system 16 further comprises a plurality of gate assemblies 102 corresponding to respective ones of the tanks 14. As best shown in FIGS. 31-34, each gate assembly 102 is configured to allow, prevent, or partially restrict flow of particulate from the corresponding tank outlet 90 to the intake opening 28.

More particularly, each gate assembly 102 includes a gate 104, a guide 106, a tank adapter or spout 108, a shiftable bracket 110, and a hydraulic cylinder 112. The guide 106 is preferably positioned adjacent the corresponding tank outlet 90 and defines an opening 114 therethrough that preferably at least substantially corresponds to the tank outlet 90. The spout 108 (see, for instance, FIG. 33) is preferably in a form of a lip extending downwardly from the opening 114 into the intake adapter 100, to at least in part guide particulate released from the tank 14 into the auger assembly 26.

The guide 106 further preferably includes a generally planar guide slot 116 extending generally laterally and dimensioned to allow sliding of the gate 104 therein. The shiftable bracket 110 preferably includes a proximal end 118 fixed relative to the tank 14 and a distal end 120 fixed relative to the gate 104. Shifting of the bracket 110 results in sliding of the gate 104 within the slot 116 so as to close, open, or partially open the opening 114 and thereby control flow of particulate from the tank outlet 90.

Preferably, as illustrated, shifting of the bracket 110 is effected by the hydraulic cylinder 112, which in a neutral or unextended state draws the gate 104 closed and in a pressurized or extended state opens the gate 104. Preferably, the hydraulic cylinders 112 are each separately operable. That is, the gates 104 may be independently opened or closed.

In a preferred embodiment, each of the brackets 110 defines slot or track 119a through which a guide pin 119b glides. Furthermore, each of the brackets 110 preferably defines a plurality of positioning holes 122. Furthermore, each gate assembly 102 preferably includes a positioning pin 124 configured for insertion through a selected one of the positioning holes 122. The positioning pin 124 acts as a mechanical stop to enable locking of the gate 104 into a predetermined position so as to allow any one of various flow rates of particulate from the corresponding tank 14 to the corresponding auger assembly 26.

Operation of the gate assemblies 102 is preferably remotely controllable. For instance, in a preferred embodiment, a wireless remote control system (not shown) is provided for operation of the gate assemblies 102, enabling an operator to have full control of the function from the ground, from the top of the vehicle 10, from the cab of a tractor or other towing vehicle, etc. Preferably, the wireless remote control system also controls the aforementioned fold/unfold function. However, other control means also fall within the scope of the present invention.

Although a gate assembly as illustrated is preferred, it is noted that any of a variety of conventional gate or metering means (e.g., rollers or alternatively configured gates) are permissible.

Figure 31:
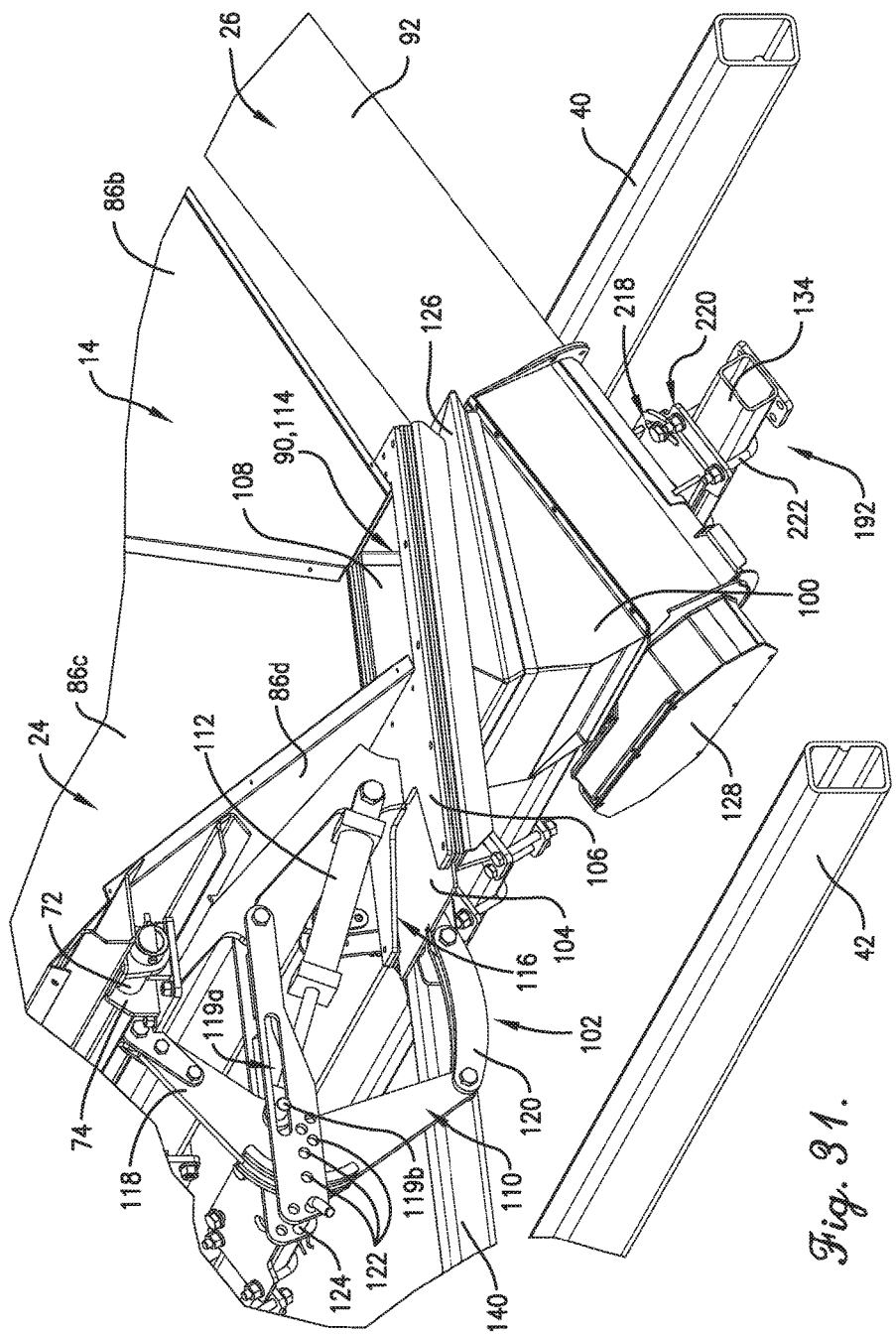
FIG. 31 is an enlarged, partially fragmented top perspective view of structures adjacent the intake opening of the carrier of FIG. 30, with the carrier in a straight, lowered configuration and with the corresponding flexible coupler in place.
Figure 32:
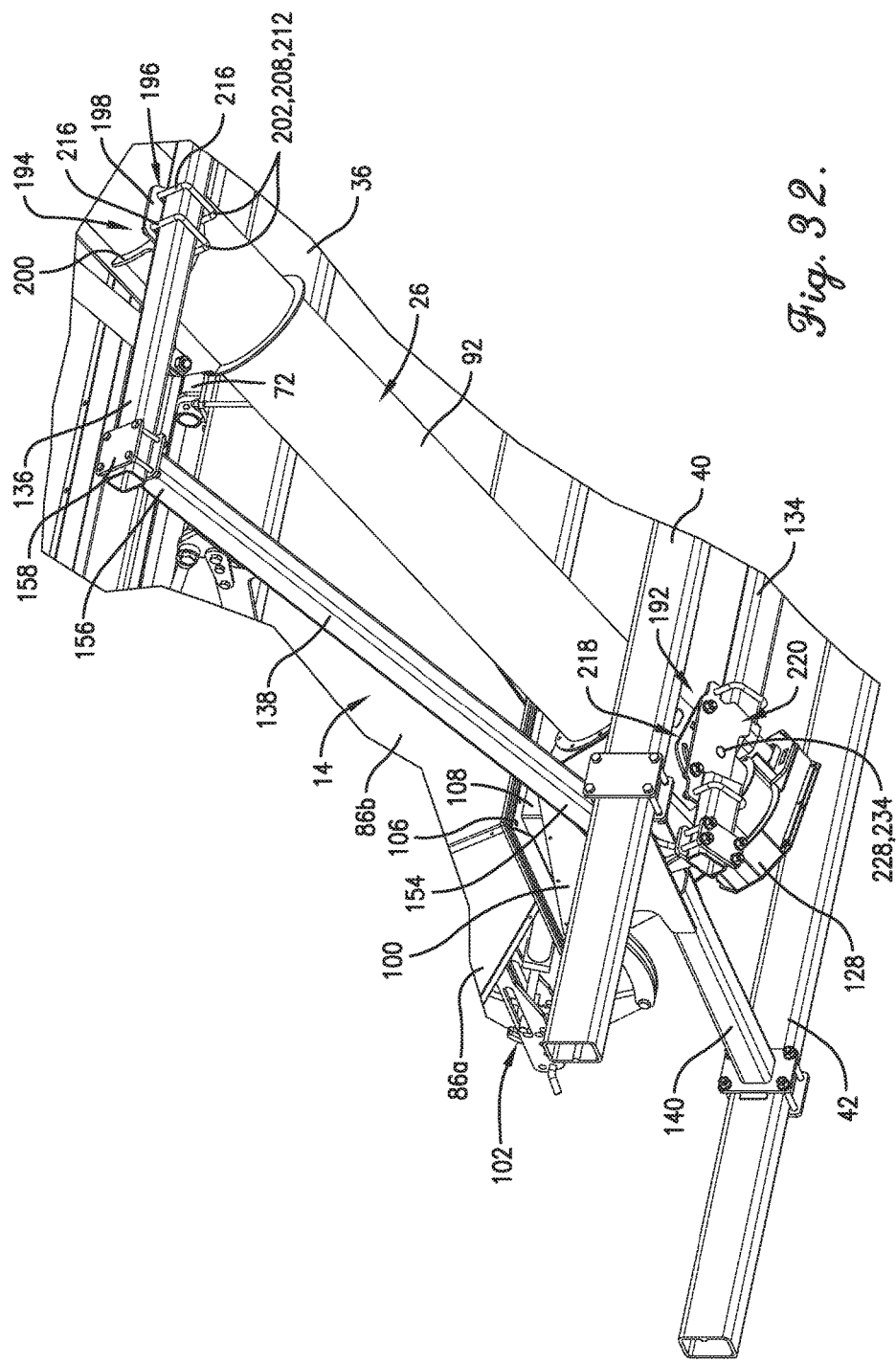
FIG. 32 is a partially fragmented bottom perspective view similar to that of FIG. 30, but the carrier in a pivoted and lowered configuration, and with the flexible coupler removed for clarity.
Figure 33:
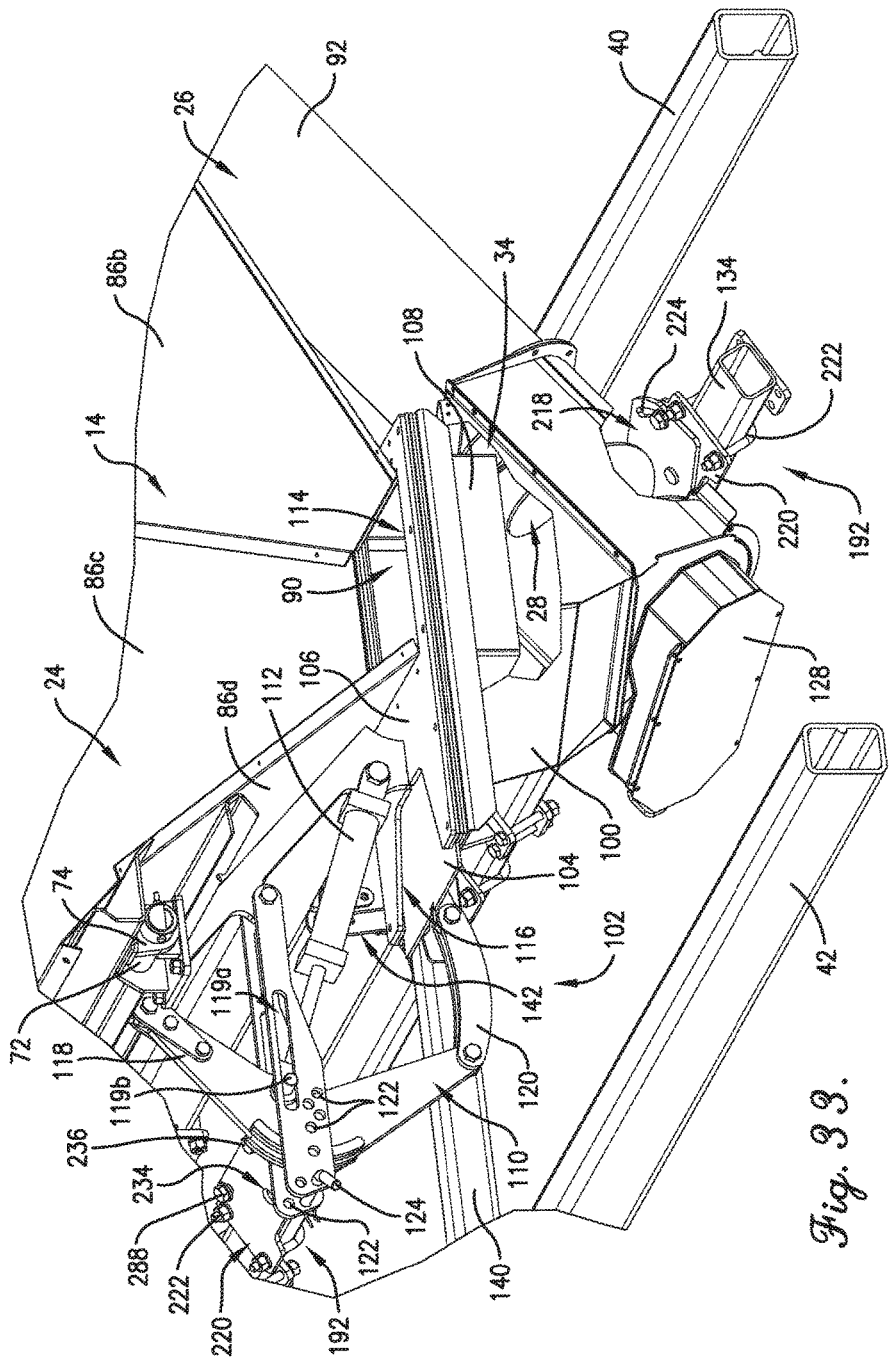
FIG. 33 is an enlarged, partially fragmented top perspective view of structures adjacent the intake opening of the carrier of FIG. 32, but with additional fragmentation provided to enable a view of the tank adapter or spout inserted into the carrier intake adapter.
Figure 34:
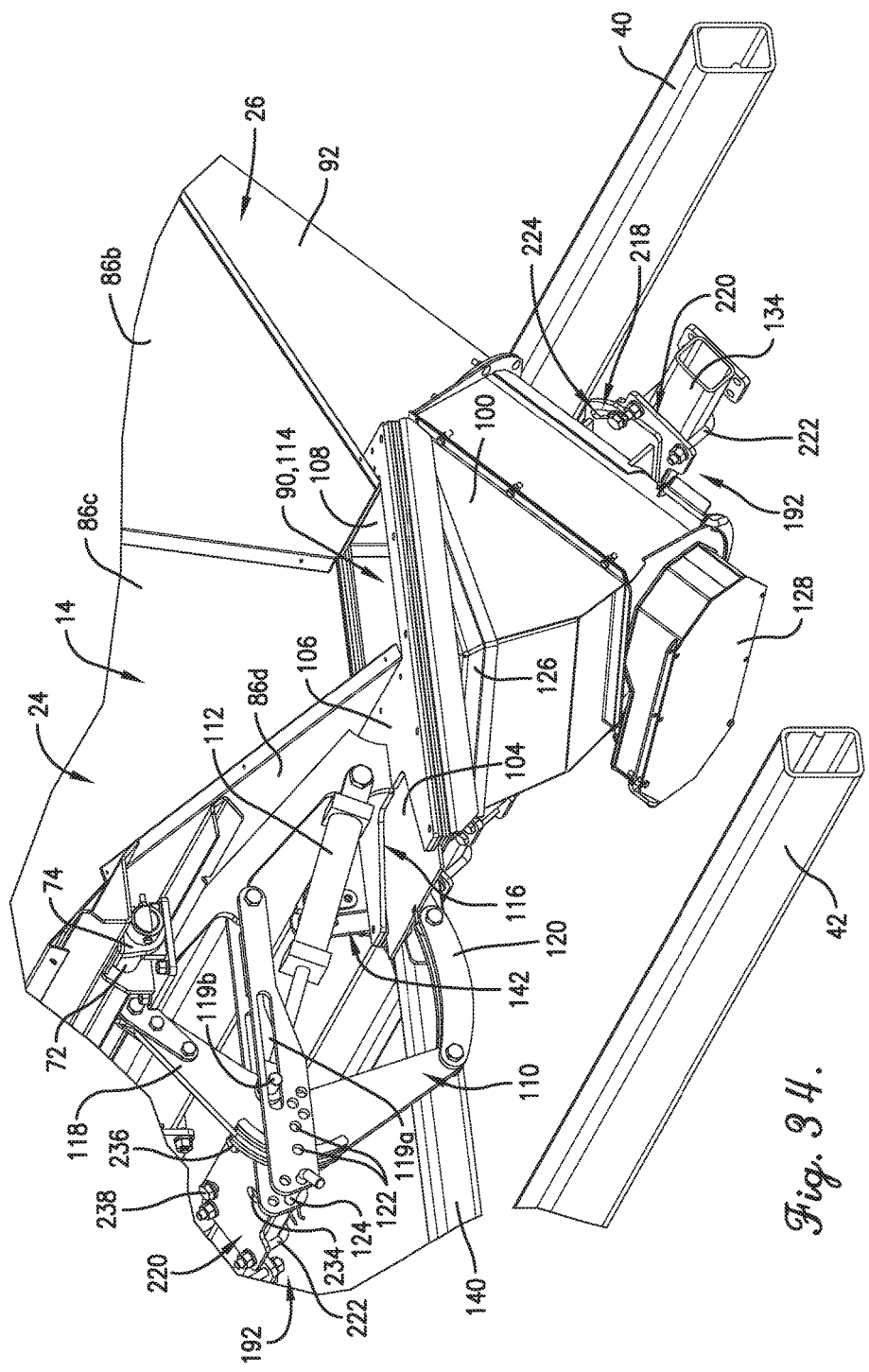
FIG. 34 is an enlarged, partially fragmented top perspective view similar to that of FIG. 33, but with the carrier in a pivoted and raised configuration, the carrier intake adapter shown in full, and the flexible coupler in place to particularly illustrate the interconnectedness of the tank and the carrier intake opening despite.
Figure 39:
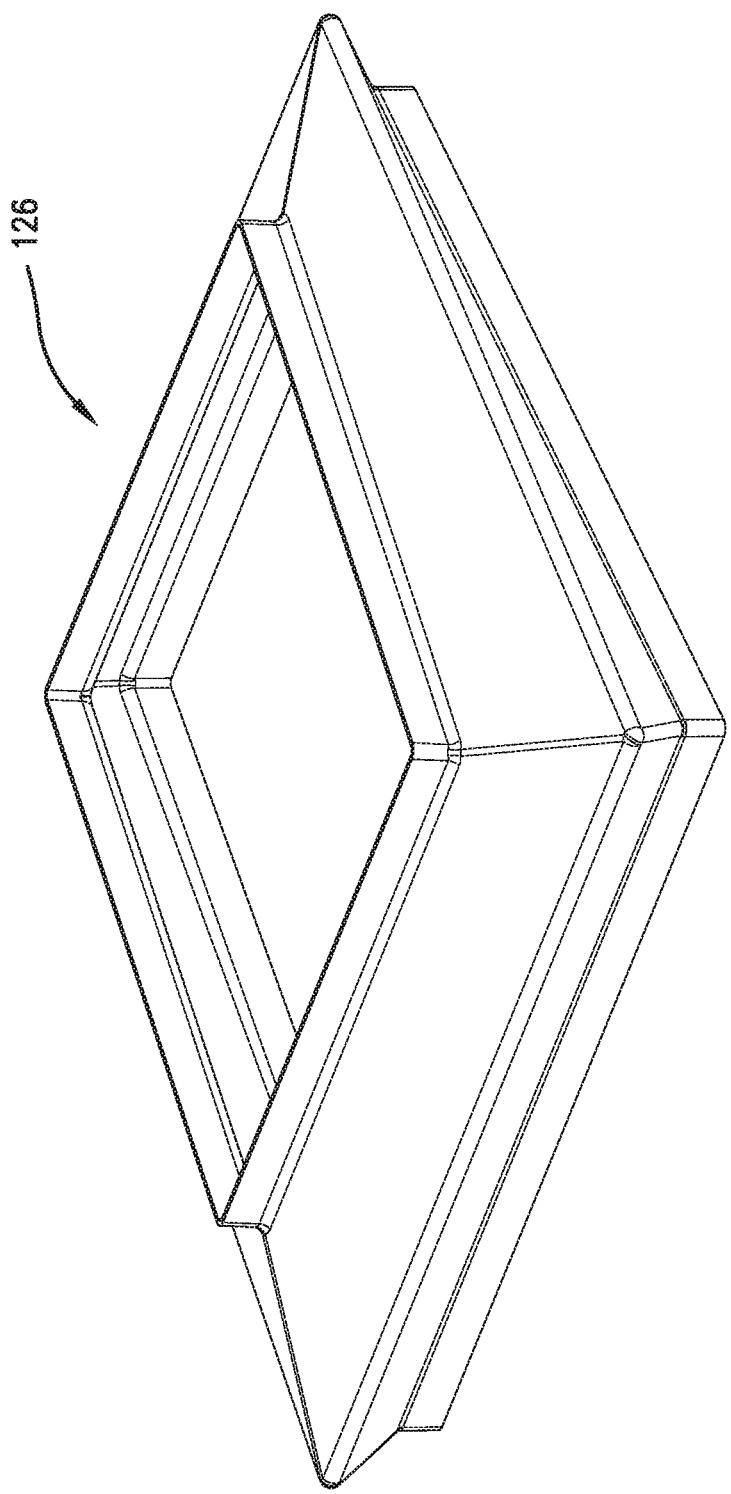
FIG. 39 is a top perspective view of the flexible coupler shown in FIGS. 30, 31, and 34, in a neutral state.
Figure 40:
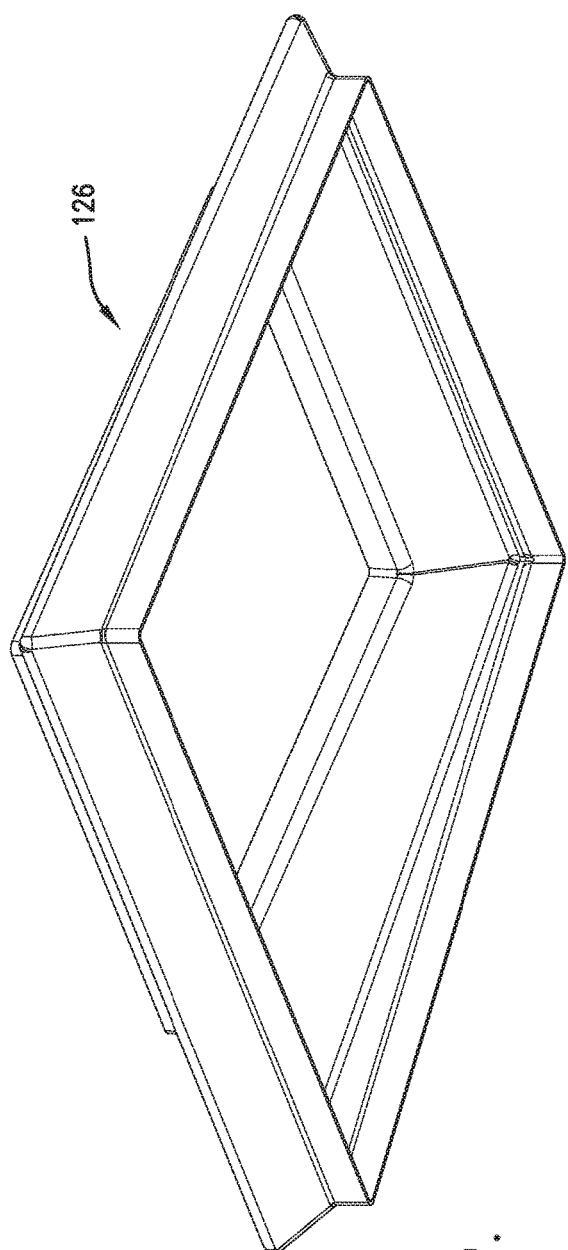
FIG. 40 is a bottom perspective view of the flexible coupler of FIG. 39.
Figure 41:
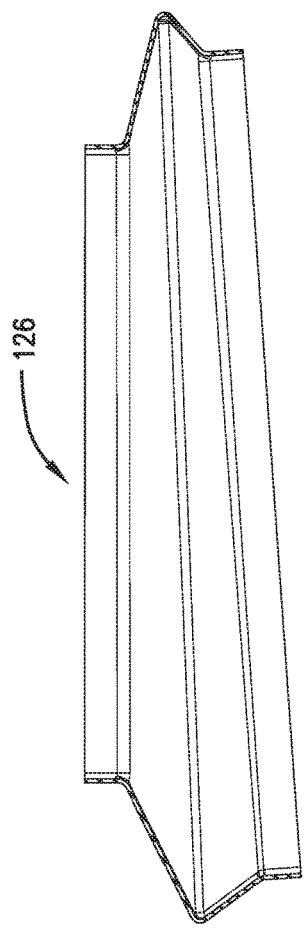
FIG. 41 is a cross-sectional side view of the flexible coupler of FIGS. 39 and 40.

The unloading system 16 further preferably includes a plurality of boots or flexible couplers 126, shown in detail in FIGS. 29-41. Each of the flexible couplers 126 couples the intake opening 28 of a respective one of the carriers 26 with the corresponding one or more of the tanks 14. More particularly, as best shown in FIGS. 31 and 34, each flexible coupler 126 is preferably fixed at an upper end to the corresponding guide 106 of the gate assembly 102 and at a lower end to the corresponding intake adapter 100 of the auger assembly 26. The flexible couplers 126 thus preferably at least substantially circumscribe the spouts 108.

Fixation of the flexible couplers 126 may be by means of fasteners or other hardware or, as illustrated, may simply be a result of friction and compressive forces generated by the relative sizing and material properties of the flexible coupler 126. For instance, in a preferred embodiment, the couplers 126 comprise molded rubber, although any one or more of a variety of materials either inherently providing flexibility (e.g., canvas) or providing flexibility by means of their configuration (e.g., certain woven or braided steels) might be used without departing from some aspects of the present invention.

As will be apparent to one of ordinary skill in the art, the couplers 126 are operable to maintain interconnection between the intake opening 28 of the respective one of the carriers 26 and the corresponding one the tanks 14 both while the carrier 26 is positioned and after it has been locked into place. In FIG. 31, for instance, the auger 34 is shown in a straight and lowered position, with the flexible connector connecting the tank outlet 90 and the auger intake opening 28 (via the guide 106 and the intake adapter 100). In FIG. 34, the interconnection is maintained despite shifting of the auger assembly 26 into a pivoted, elevated position.

Preferably, each of the carriers 26 includes its own hydraulic motor assembly 128 for driving the conveying mechanism 34 (e.g., the auger 34). Each of the hydraulic motor assemblies 128 preferably includes a hydraulic motor and a drive sprocket setup. However, a variety of configurations are suitable for use with the present invention.

Each hydraulic motor assembly 128 is preferably supplied with hydraulic fluid by the previously described PTO-driven pump assembly 64. More particularly, the pump assembly 64 preferably includes a power takeoff shaft 130 connectable to a towing vehicle (e.g., tractor) and a housing 132 at least substantially enclosing a high-capacity gearbox (not shown) driven by the shaft 130; four (4) high-capacity pumps (not shown) corresponding to respective ones of the carriers 26 and mounted directly to the gearbox; and an oil reservoir (not shown) for supplying hydraulic fluid to the pumps. Furthermore, four (4) valves (not shown) are preferably provided for controlling flow of hydraulic fluid to respective ones of the hydraulic motor assemblies 128. Thus, unloading or transfer of particulate by each auger 34 may be independently controlled via independent operation of the valves.

Preferably, the total power required is between about forty (40) horsepower (hp) and sixty (60) hp.

Operation of each auger 34 is preferably coordinated with that of the corresponding gate assembly 102. For instance, in a preferred embodiment, a shared controller (not shown) controls both gate 104 positioning and auger 34 on/off functions. As will be apparent to one of ordinary skill in the art, appropriate flow rates out of the tanks 14, as controlled by the gates 104, will facilitate efficient operation of the augers 34. Furthermore, flow rate control may also be beneficial at the output end of the operation to ensure efficient filling of the target grain bag, semi-trailer, air seeder, etc.

Further integration of the controller with the load cells 72 is also advantageous. For instance, the controller might control the gate 104 position and the auger 34 operation to unload a given amount of particulate from the respective tank 14, then close the gate 104 and turn off the auger 34 for that particular tank 14. Other ones of the tanks 14, augers 34, and gates 104 might simultaneously be operating under different requirements (e.g., unloading more or less particulate at a higher or lower flow rate).

Alternatively or additionally, the controller might also be integrated with a fill sensor in the target vehicle or structure. For instance, the controller might signal appropriate ones of the augers 34 and gates 104 based on feedback from a fill sensor in a tank of a semi-trailer or air seeder being filled by the auger assemblies 26 of the vehicle 10.

Preferably, control of the previously described functions may be achieved remotely. For instance, in a preferred embodiment, the controller is preferably the aforementioned wireless remote control system (not shown), with the single system controlling the previously described auger fold/unfold function, the individual gate assembly open/close function, and the individual auger on/off function. However, other control means, including both local and remote control systems, also fall within the scope of the present invention.

Carrier Mounting Overview

In a preferred embodiment, as noted previously, the carriers 26 are preferably mounted to the frame 12 in such a manner as to be isolated both from the tanks 14 and from the load cells 72. (That is, the carriers 26 are preferably in no manner supported by the tanks 14 or the load cells 72.) Such isolation enables both more accurate data to be acquired by the load cells 72 and adjustable positioning of the carriers 26 relative to the tanks 14 without the use of the tanks 14 for support. The latter feature facilitates the previously described modular nature of the tank 14 setup, with removal and reconfiguration of the tanks 14 greatly simplified. That is, the universal frame 12, the modular tanks 14, and the independently mounted carriers 26 enable efficient setup of the vehicle 10 with any number of tanks as required by the particular application.

Carrier Lifting Mechanism

As shown in FIGS. 16-23 and others, the vehicle 10 and, more particularly, the lifting mechanism 20 and the carrier positioning system 22, preferably includes a pair of elongated, vertically and horizontally spaced apart (i.e. diagonally spaced apart) proximal and distal positioning rails 134 and 136, respectively. The positioning rails 134 and 136 extend generally in the fore-and-aft direction alongside corresponding ones of the lower and upper frame rails 40 and 36, respectively. The positioning rails 134 and 136 cooperatively at least in part support the carriers 26 at both proximal and distal locations therealong. More particularly, the proximal positioning rail 134 preferably at least in part supports the carriers 26 adjacent the intake openings thereof, while the distal positioning rail 136 preferably supports the carriers 26 proximal to but generally adjacent the hinges 80 thereof.

As will be described in greater detail below, the positioning rails 134 and 136 are preferably each shiftable, with generally vertical shifting of the distal positioning rail 136 simultaneously raising or lowering each of the discharge openings 30 and with corresponding shifting of the proximal positioning rail resulting in shifting of the carriers 26 adjacent the intake openings 28. However, simultaneous adjustment of the discharge and/or intake openings is not required according to certain aspects of the present invention. For instance, independent raising and lowering of each of the carriers or a subset of the carriers is permissible according to some aspects of the present invention.

The lifting mechanism 20 further preferably includes a plurality of generally diagonally extending braces 138 extending between the proximal and distal positioning rails 134 and 136, respectively. The lifting mechanism 20 additionally preferably includes a cross-support bar 140 fixed to and extending generally orthogonally from one of the bottom frame rails 40,42 (preferably the bottom frame rail 42). Still further, the lifting mechanism 20 preferably includes a bracket 142 fixed to and extending generally orthogonally from the other of the bottom frame rails 40,42 (preferably the bottom frame rail 40) and toward the corresponding cross-support bar 140.

The bracket 142 preferably includes a pair of spaced apart side plates 144 and 146, as well as a center plate 148. The cross-support bar 140 preferably extends between the side plates 144 and 146 and is rigidly fixed thereto (e.g., by welding, adhesives, or fasteners). The center plate 148 preferably defines a slot 150 and is pivotably secured between the side plates 144 and 146 by means of a pivot pin 152 extending between the side plates 144,146 and received in the slot 150.

Preferably, each brace 138 includes a proximal end 154 and a distal end 156. The proximal end 154 is preferably fixed to the corresponding one of the center plates 148 (e.g, by welding, adhesives, or fasteners) so as to be pivotably secured to the bracket 142. The distal end 156 is preferably fixed to the distal positioning rail 136 by means of a bracket 158, although other means (e.g., welding, adhesives, or fasteners) may be used without departing from the scope of the present invention.

Each center plate 148 is preferably additionally fixed to the proximal positioning rail 134, such that pivoting or shifting of the distal positioning rail 136 results in pivoting or shifting of the braces 138, which results in pivoting or shifting of the center plates 148, which results in pivoting or shifting of the proximal positioning rail 134, or vice versa. As will be readily apparent to one of ordinary skill in the art, then, pivoting or shifting of the distal positioning rail 136 results in shifting or pivoting of the carriers 26, including the intake openings 28 and the discharge openings 30. Furthermore, although the angular displacements of the openings 28 and 30 will be at least substantially similar, the Euclidean displacements—i.e., the magnitudes of translation—will be greater for the discharge openings 30 primarily by merit of the discharge openings 30 being spaced a greater distance from the corresponding pivot pins 152 than are the intake openings 28.

It is also noted that the center plate 148 positions the proximal positioning rail 134 so as to be laterally spaced from each of the bottom frame rails 40 and 42.

As best shown in FIGS. 24-29, the lifting mechanism 20 preferably includes a plurality of hydraulic cylinder assemblies 160 each coupled to the frame 12 and a respective one of the braces 138. Operation of the hydraulic cylinder assemblies 160 preferably pivotably shifts the braces 138 and, in turn, the positioning rails 134 and 136.

More particularly, each brace 138 is preferably supported relative to the upper frame rail 36 by one of said hydraulic cylinder assemblies 160. Each hydraulic cylinder assembly 160 preferably includes a cylinder 162 having ends fixed to a bracket 164 that extends between and interconnects the corresponding brace 138 and the upper frame rail 36. Preferably, the bracket 164 includes a frame component 166 that fixes the hydraulic cylinder assembly 160 to the upper frame rail 36, a brace component 168 that fixes the hydraulic cylinder assembly 160 to the brace 138, and an arm 170 that extends between and interconnects the frame component 166 and the brace component 168.

The hydraulic cylinder 162 and the arm 170 are preferably linked to the frame component 166 in such a manner that extension and retraction of the hydraulic cylinder 162 pivotably shifts the brace 138 and, in turn, the proximal and distal positioning rails 134 and 136. As noted previously, shifting of the positioning rails 134 and 136 results in corresponding simultaneous shifting of all of the carriers 26, which in turn results in adjustment of the vertical positions of the discharge openings 30.

Preferably, extension of the hydraulic cylinders 162 corresponds to lowering of the carriers 26, while retraction of the hydraulic cylinders 162 corresponds to raising of the carriers 26. However, an opposite configuration is permissible according to some aspects of the present invention.

As discussed above with regard to the air seeder tender configuration (see FIGS. 6-9) and the grain cart configuration (see FIGS. 10-15), the ability to raise or lower the carriers 26 advantageously allows optimal vertical positioning of the discharge openings 30 for unloading of the tanks 14 into different target vehicles or structures, including but not limited to semi-trailers, air seeders, and grain baggers. For instance, the carriers 26 might initially be raised such that the chutes 98 have significant clearance relative to the tanks of a target air seeder as the vehicle approaches and is maneuvered into alignment with the seeder, then lowered so as to insert the chutes 98 into the air seeders's tank openings for direct particulate transfer.

Preferably, control of the previously described raise/lower functions may be achieved remotely. For instance, in a preferred embodiment, the controller is preferably the aforementioned wireless remote control system (not shown), with the single system controlling the previously described auger fold/unfold function, the individual gate assembly open/close function, the individual auger on/off function, and the collective carrier raise/lower function. However, other control means, including both local and remote control systems, also fall within the scope of the present invention.

Carrier Locking Mechanism

As shown in FIGS. 16-23, the vehicle 10 preferably includes a locking mechanism 172 for retaining the carriers 26 in the raised position. Such a feature is particularly advantageous during a transport operation (see the configuration illustrated in FIGS. 1-5), cooperating with the hydraulic cylinder assemblies 160 to provide redundant securement of the carriers 26.

Preferably, the locking mechanism 172 broadly includes a shiftable locking bar 174 including a handle 176; a fixed receiver 178 defining a fixed slot 180; a pivotable latch plate 182 pivotably fixed to the locking bar 174 and defining a pivoting slot 184; and, for each hydraulic cylinder assembly 160, a translating locking pin 186 mounted to a rocker 188. The locking pin 186 and the rocker 188 are preferably associated with the frame component 166 of the bracket 164, although disassociation is permissible according to some aspects of the present invention.

Figure 25:
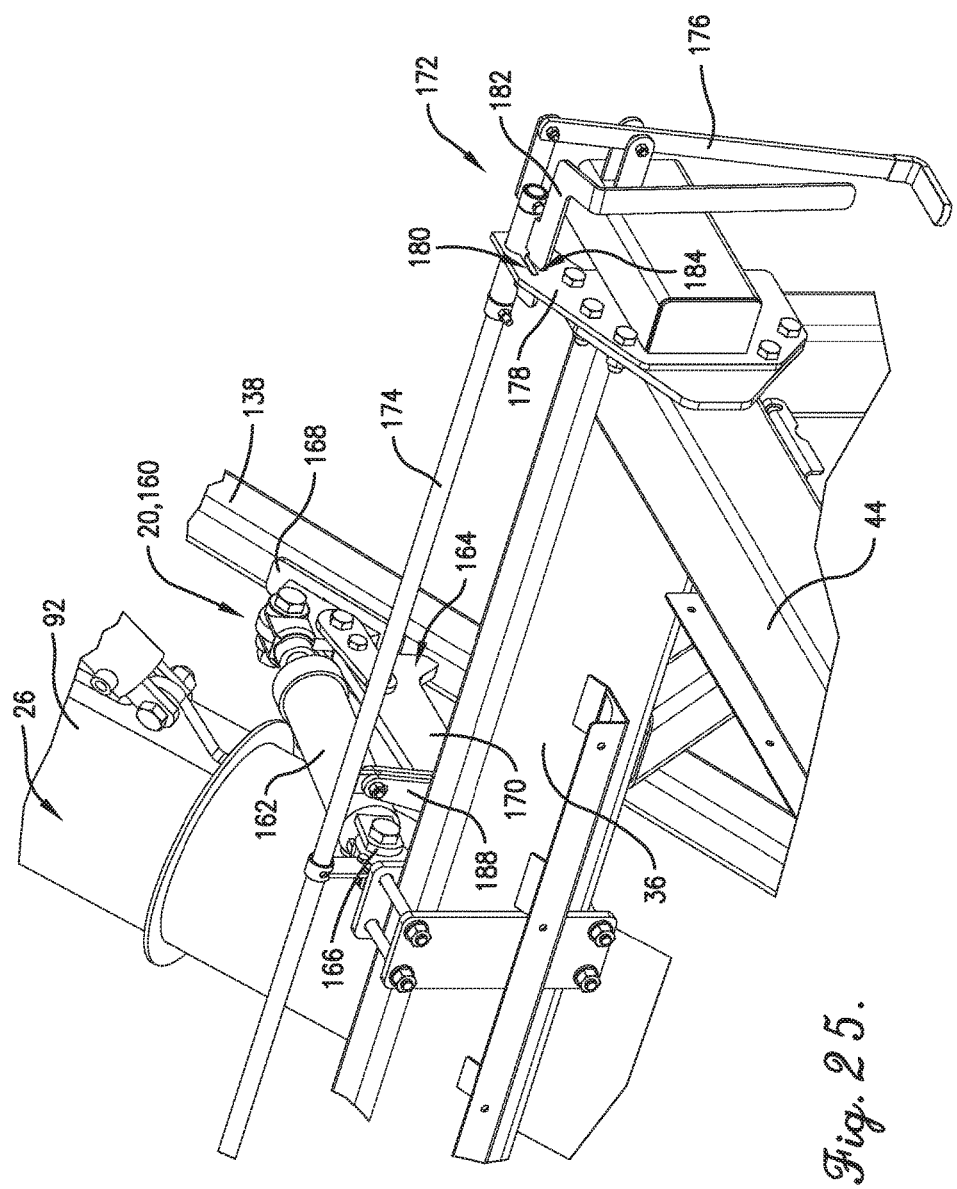
FIG. 25 is a further enlarged, fragmentary view of a portion of the locked carrier locking mechanism as shown in FIG. 24.
Figure 26:
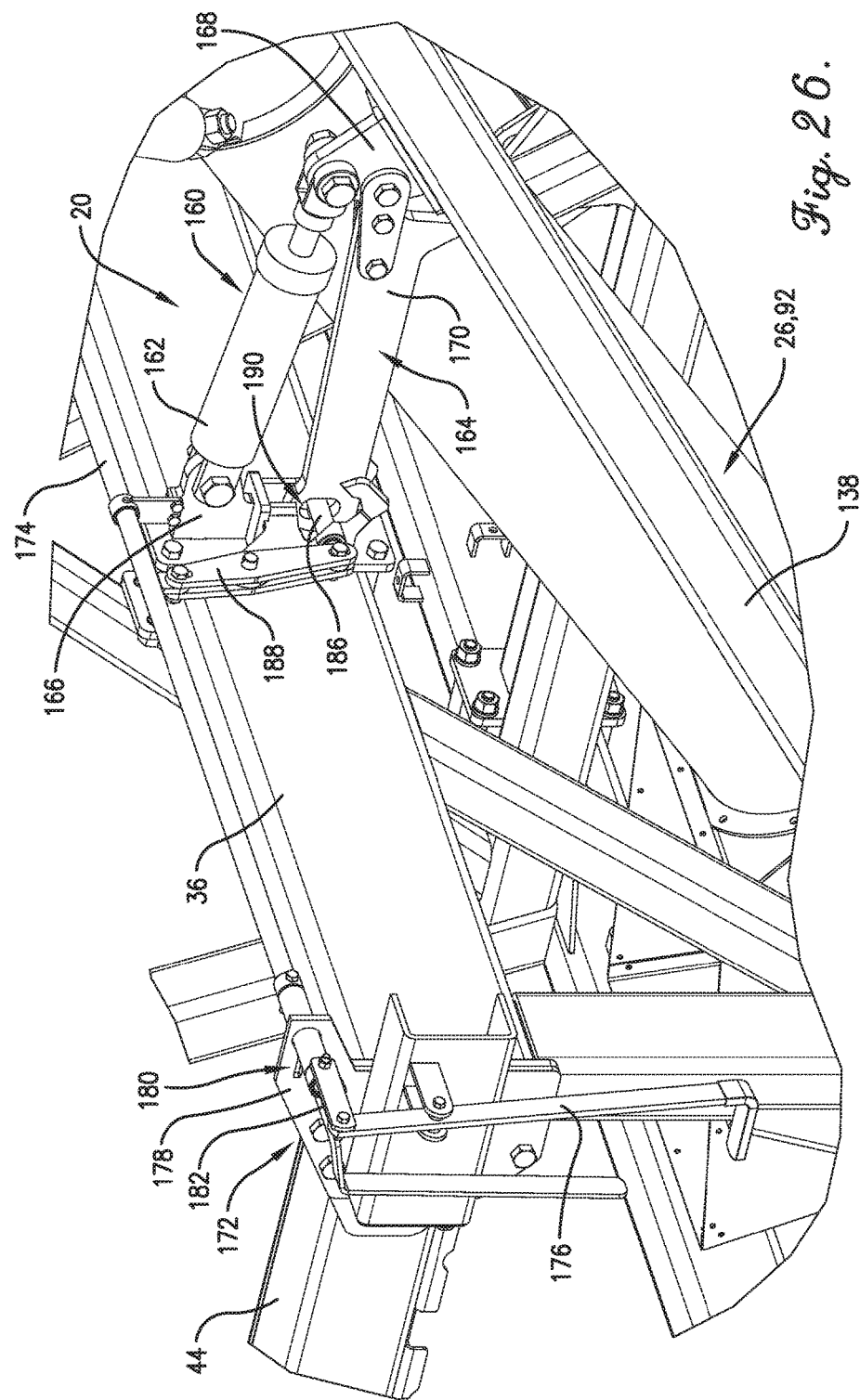
FIG. 26 is a front perspective view from a distal vantage point of the portion of the locked carrier locking mechanism shown in FIG. 25, with additional fragmentation provided to enable a view of the locking pin engagement.

In a locked configuration, best shown in FIGS. 24-26, the handle 176 is positioned adjacent the frame 12 in an inward position, such that the locking bar 174 is in a foremost position and the rocker 188 has pivoted to translate the locking pin 186 in an aft direction. The previously mentioned arm 170 of the bracket 164 preferably defines a locking hole 190. Translation of the locking pin 186 in the aft direction results in insertion of the locking pin 186 in the locking hole 190. Furthermore, the frame component 166 preferably defines a pair of guide holes 191 that guide and/or receive the pin 186 to secure the pin 186 against generally lateral shifting. The arm 170 therefore cannot shift generally orthogonally relative to the locking pin 186 and, in turn, cannot shift generally orthogonally relative to the upper frame rail 36, which effectively disables expansion of the corresponding hydraulic cylinder 162 (assuming reasonable, operational pressure therein). This, in turn, disables pivoting of the respective brace 138 and consequent shifting of other components of the vehicle 10, as discussed in detail above.

Preferably, retention of the handle 176 in the inward position is achieved by pivoting of the latch plate 182 to dis-align the pivoting slot 184 relative to the fixed slot 180. As illustrated, such disalignment results in engagement of the latch plate 182 against the fixed receiver 178, which prevents translation of the locking bar 174 (or pivoting of the handle 176). More particularly, the latch plate 182 is in part received in the pivoting slot 184.

Figure 27:
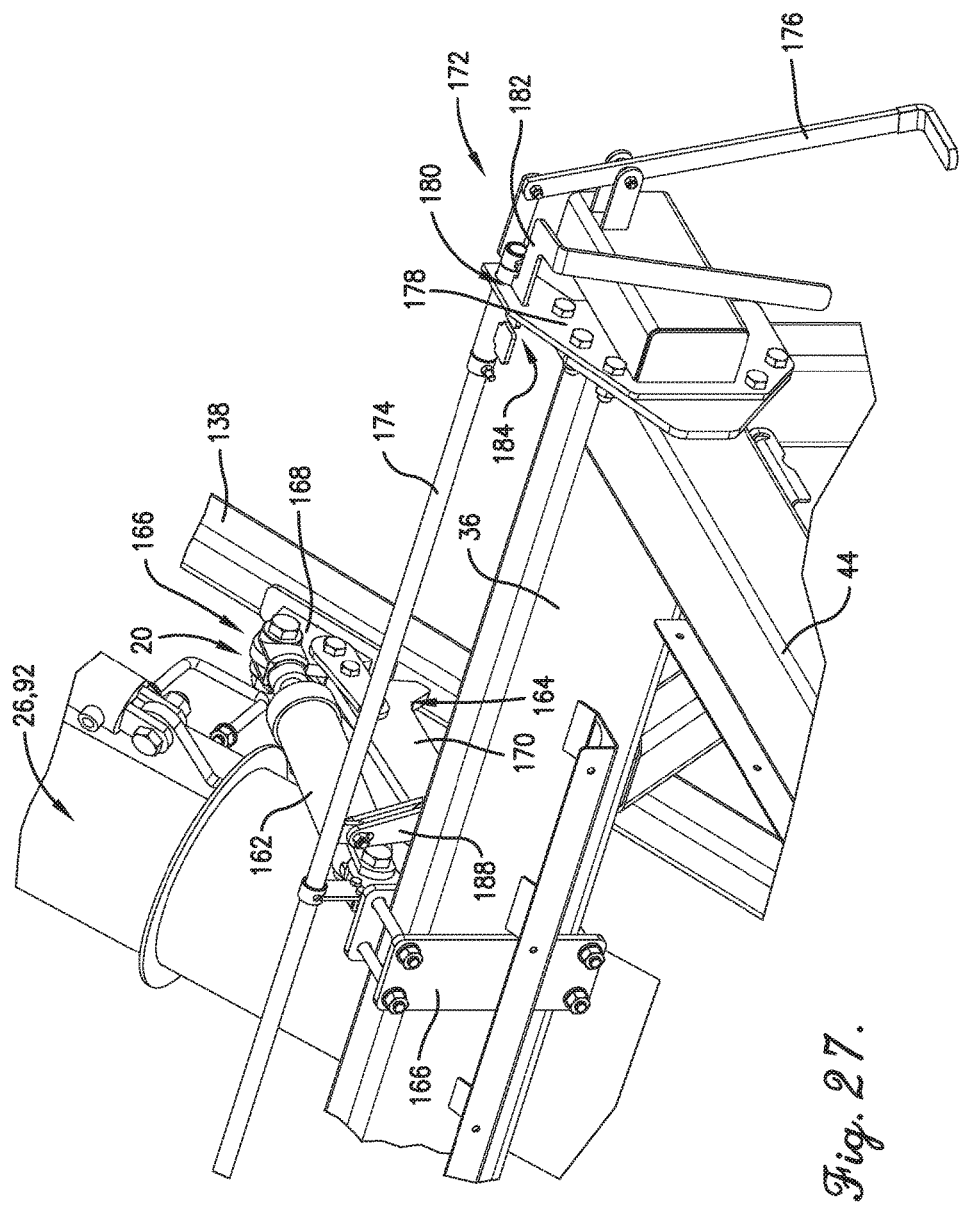
FIG. 27 is a front perspective view from a proximal vantage point of the portion of the locked carrier locking mechanism shown in FIGS. 25 and 26, but with the carrier locking mechanism unlocked.
Figure 28:
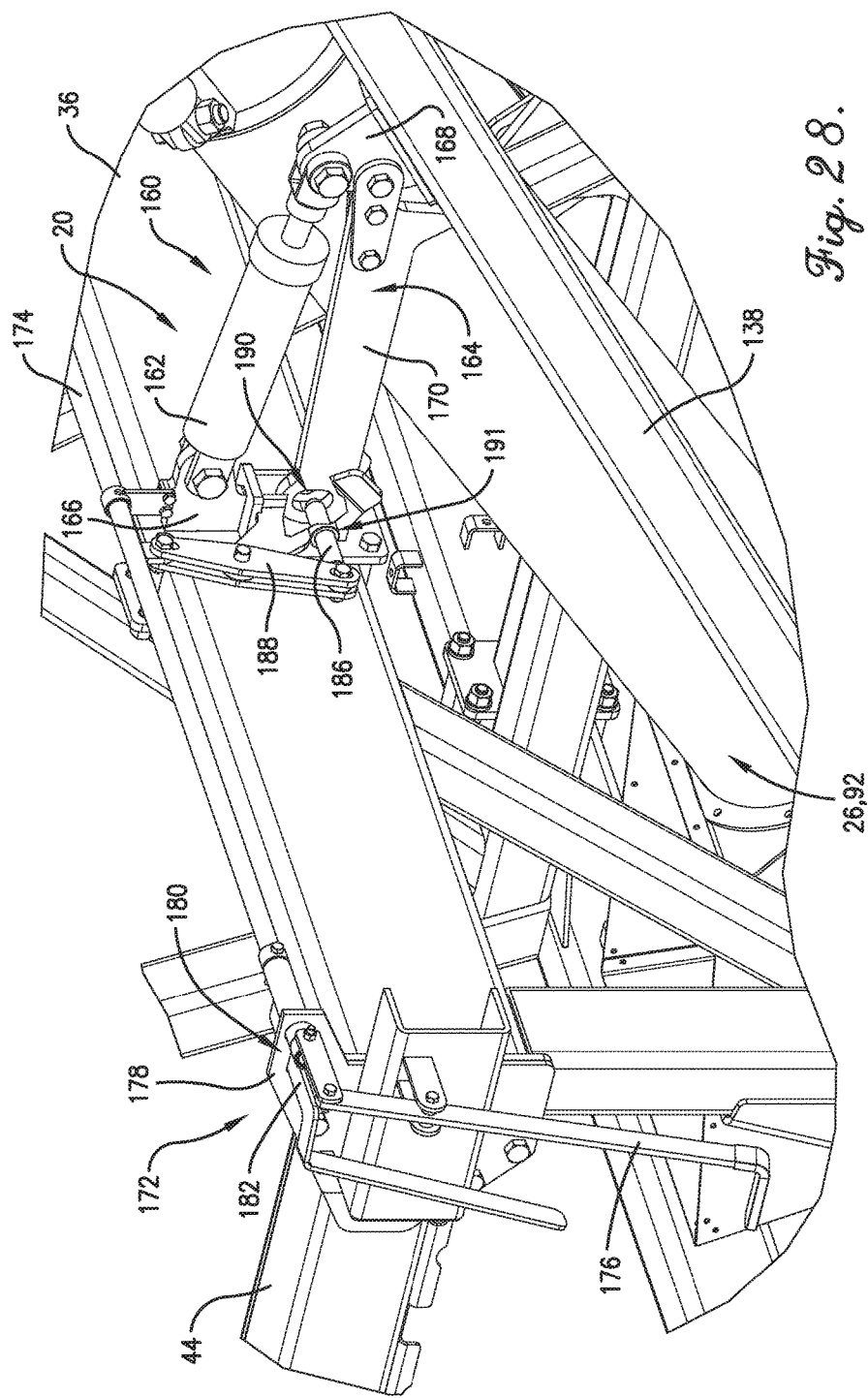
FIG. 28 is a front perspective view from a distal vantage point of the portion of the carrier locking mechanism shown in FIGS. 25-27, with the carrier locking mechanism unlocked and with additional fragmentation provided to enable a view of the locking pin disengagement.
Figure 29:
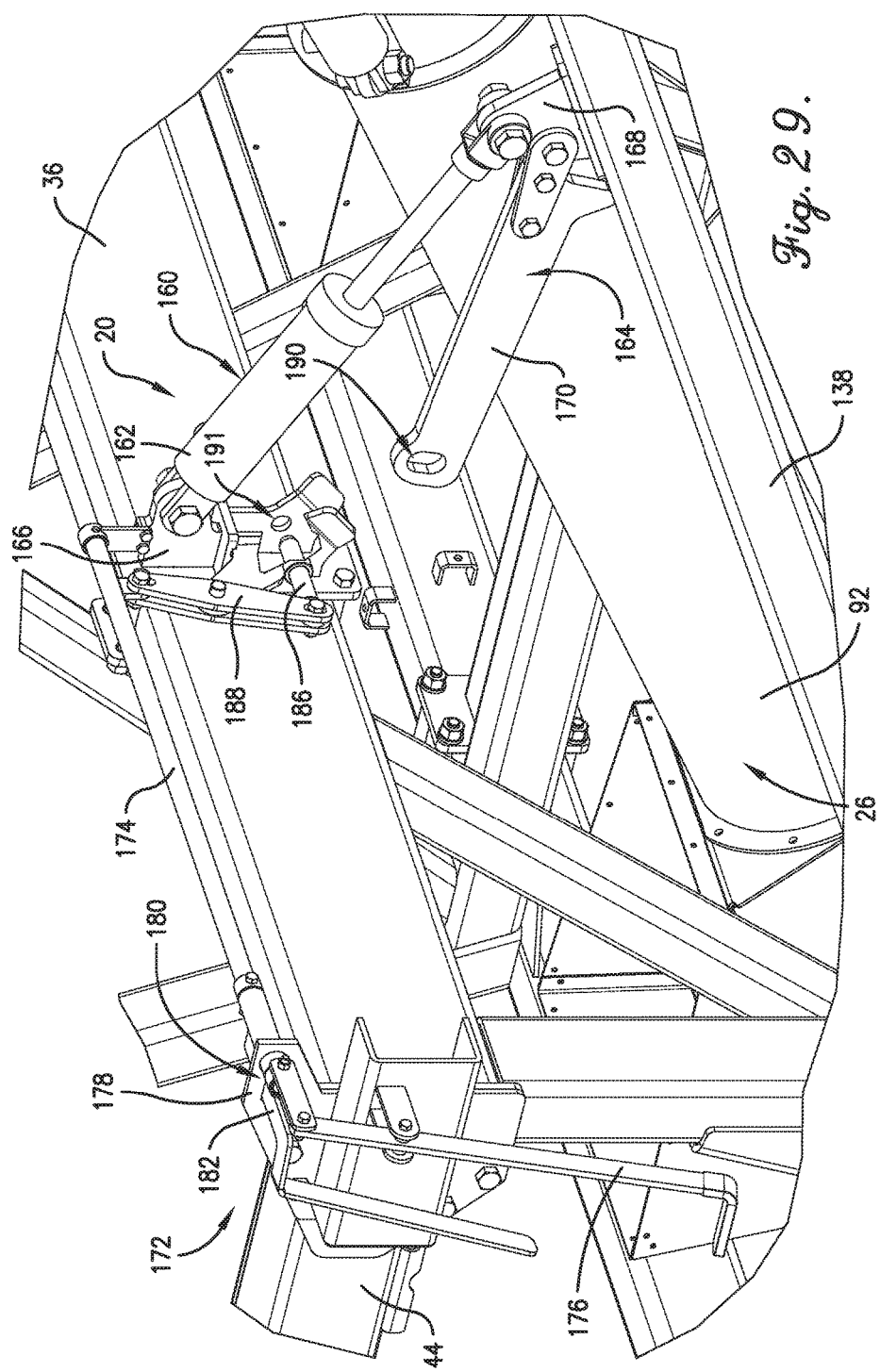
FIG. 29 is a front perspective view from a distal vantage point of the portion of the carrier locking mechanism shown in FIGS. 25-28, with the carrier locking mechanism unlocked, with additional fragmentation provided to enable a view of the locking pin disengagement, and with the carrier lowered.
Figure 30:
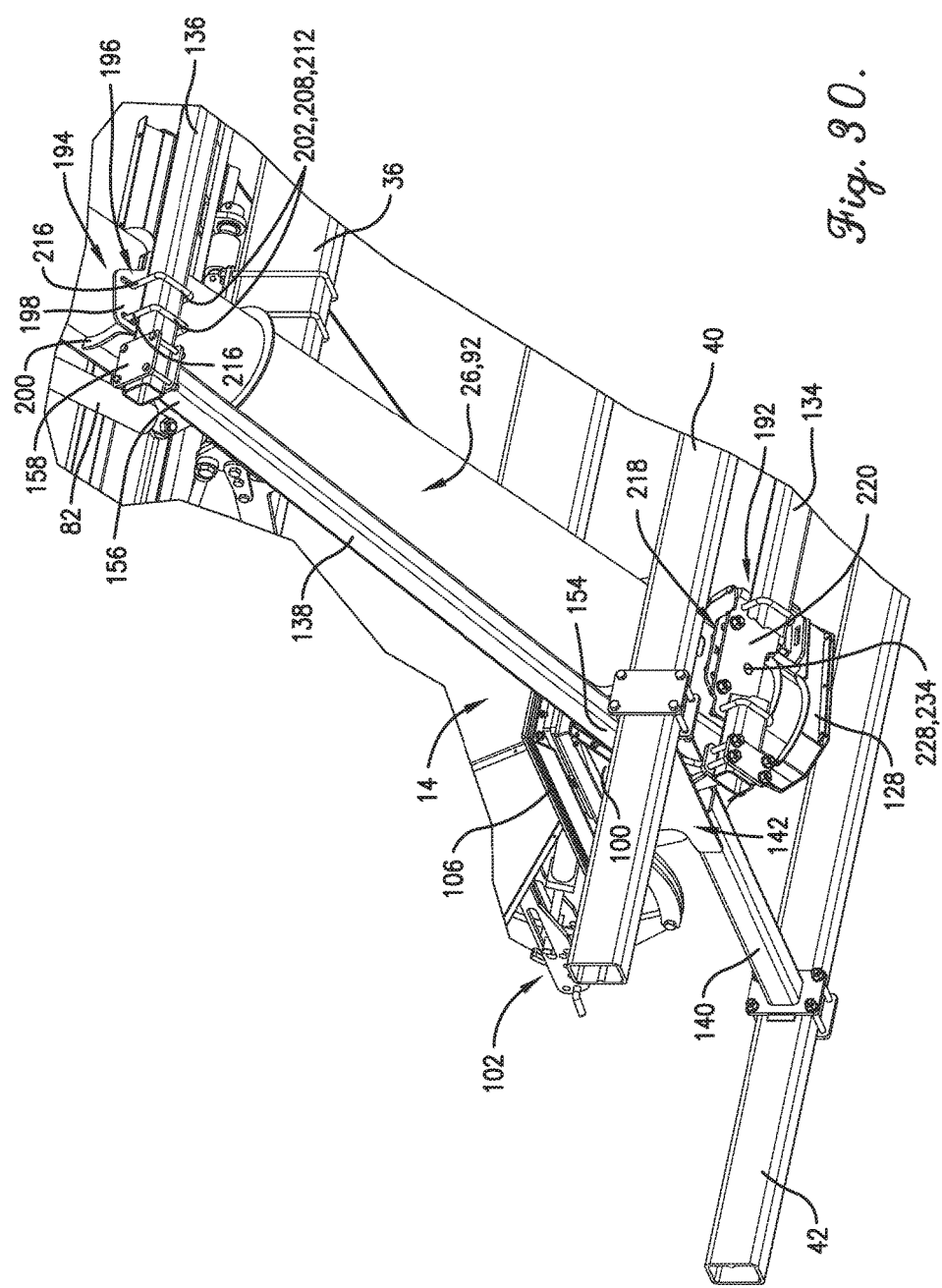
FIG. 30 is a partially fragmented bottom perspective view illustrating a carrier in a straight, lowered configuration and with the corresponding flexible coupler in place.

In an unlocked configuration, best illustrated in FIGS. 27-29, the latch plate 182 has been pivoted to align the fixed and pivoting slots 180 and 184, respectively. Such alignment enables receipt of the latch plate 182 in the fixed slot 180 and, in turn, outward pivoting of the handle 176. Outward pivoting of the handle 176 results in translation of the locking bar 174 in an aft direction, which in turn results in pivoting of the rocker 188 to translate the locking pin 186 in a fore direction and out of the locking hole 190. Thus, the arm 170 is free to shift generally orthogonally relative to the locking pin 186, enabling expansion of the corresponding hydraulic cylinder and consequent pivoting of the respective brace and shifting of other components of the vehicle 10, as discussed above.

However, although the above-described locking mechanism is preferred, any one or more of a variety of locking approaches may be implemented without departing from the scope of some aspects of the present invention.

Carrier Positioning System

The carrier positioning system 22 is best illustrated in FIGS. 30-38. As noted previously, the carrier positioning system 22 preferably enables adjustable positioning of the carriers 26 relative to the tanks 14.

The carrier positioning system 22 preferably broadly includes the aforementioned proximal and distal positioning rails 134 and 136, respectively; a plurality of proximal positioning devices 192 mounted to the proximal positioning rail 134 and corresponding to respective ones of the carriers 26; and a plurality of distal positioning devices 194 mounted to the distal positioning rail 136 and corresponding to respective ones of the carriers 26.

In a preferred embodiment, each distal positioning device 194 includes a bracket 196 circumscribing the distal positioning rail 136 and supporting the corresponding one of the carriers 26. More particularly, each bracket 196 preferably includes a shift plate 198, a carrier receiver 200, and a pair of fasteners 202.

As best shown in FIGS. 35 and 36, the shift plate 198 and the receiver 200 in a preferred embodiment are integrally formed with the conduit 92, although non-integral connection of either or both of the shift plate and receiver (e.g., by means of fasteners, welding, or adhesives) is permissible according to some aspects of the present invention.

The shift plate 198 preferably defines two (2) axially spaced apart (i.e., in a fore-and-aft direction) pairs of laterally spaced apart proximal and distal slots 204 and 206, respectively. Preferably, each slot 204,206 extends generally perpendicular to the distal positioning rail 136. Each fastener 202 preferably comprises a U-bolt 208, a pair of nuts 210, and a pair of washers 211. Each U-bolt 208 preferably includes a U-shaped body 212 that in part circumscribes the distal positioning rail 136. Each U-bolt 208 further includes a pair of proximal and distal ends 214,216 that extend through a respective pair of the proximal and distal slots 204,206. The U-bolts 208 thus cooperatively at least in part secure the shift plate 198 relative to the distal positioning rail 136.

Preferably, the slots 204 and 206 are sized relative to the ends 214 and 216 such that, upon sufficient loosening of the nuts 210, the shift plate 198 and, in turn, the corresponding one of the carriers 26, are shiftable relative to the U-bolts 208 and the distal positioning rail 136. That is, the ends 214,216 of the U-bolts 208 may be slidably shifted within the corresponding slots 204,206 to enable shifting of the corresponding carriers 26. More particularly, each distal positioning device 194 may be slidably shifted along the distal positioning rail 136.

Thus, each of the distal positioning devices 194 has an unlocked configuration associated with loosened nuts 210 (or, more broadly, loosened fasteners 202) and a locked configuration associated with tightened nuts 210 (or, more broadly, loosened fasteners 202). The unlocked configuration enables independent shifting of the distal positioning device 194 (or the bracket 196) relative to the distal positioning rail 136, wherein shifting of each of the distal positioning devices 194 results in shifting of the corresponding discharge opening 30. The locked configuration at least substantially restricts shifting of the distal positioning device 194 (or the bracket 196) relative to the distal positioning rail 136.

Preferably, as noted above, the vehicle 10 has a fore end 66 and an aft end 67 defining an axis therebetween. Furthermore, as also previously discussed, the distal positioning rail 136 preferably extends generally axially. Thus, the distal positioning devices 194 are preferably shiftable in a fore-and-aft direction along the distal positioning rail 136.

Each of the proximal positioning devices 192 preferably broadly includes a pivot plate 218 and a base plate 220. The base plate 220 is preferably fixed to the proximal positioning rail 134 by means of a pair of U-bolts 222, although any type of faster or other securement means (e.g., welding or adhesives) may be used. The pivot plate 218 is preferably fixed to a corresponding one of the carriers 26 adjacent the corresponding intake opening 28. Preferably, the pivot plate 218 is integrally formed with the conduit 92. However, non-integral connection (e.g., by means of fasteners, welding, or adhesives) is permissible.

The pivot plate 218 preferably at least in part overlies the base plate 220 and is pivotable relative thereto. More particularly, the pivot plate 218 preferably defines a pair of axially spaced apart, generally arcuate pivot slots 224,226, each preferably extending along a shared arc. The pivot plate 218 further preferably defines a downwardly projecting pivot pin 228. The base plate 220 preferably defines a pair of axially spaced apart, generally circular fastener-receiving holes 230,232 corresponding to the pivot slots 224,226. The base plate 220 further preferably defines a pinhole 234 corresponding to the pivot pin 228. The pin 228 is preferably rotatably received in the pinhole 234 to at least in part secure the pivot plate 218 to the base plate 220.

Furthermore, the proximal positioning device 192 preferably includes a pair of fasteners 236,238 extending through respective ones of the pivot slots 224,226. The fasteners 236,238 and the pivot slots 224,226 are preferably sized and shaped relative to each other such that the fasteners 236,238 are shiftable within the corresponding pivot slots 224,226. In contrast, the fasteners 236,238 and the fastener-receiving holes 230,232 are preferably sized and shaped relative to each other such that the fasteners 236,238 are at least substantially fixed within the fastener-receiving holes 230,232. That is, the fasteners 236,238 are preferably generally fixed against shifting relative to the base plate 220. The pivot plate 218 is thereby preferably pivotably secured relative to the base plate 220 and the proximal positioning rail 134, with pivoting occurring about the pivot pin 228.

As will be apparent to one of ordinary skill in the art, in a preferred embodiment as described above, shifting of each the distal positioning devices 194 along the distal positioning rail 136 results in shifting of the fasteners 236,238 (of the corresponding one of the proximal positioning devices 192) in the pivots slots 224,226. Such shifting results in pivoting of the corresponding pivot plate 218 and the intake opening 28 about the pivot pin 228 and relative to both the corresponding base plate 220 and the proximal positioning rail 134. More broadly, the corresponding carrier 26 pivots about the pivot pin 228.

It is noted that the above-described pivoting or shifting mechanisms are shown in operation throughout the Figures. However, FIGS. 30 and 31 perhaps best illustrate the proximal and distal positioning devices 192 and 194 configured for a carrier 26 extending generally straight outwardly. In contrast, FIGS. 32 and 33 perhaps most clearly illustrate the proximal and distal positioning devices 192 and 194 configured for a pivoted carrier 26.

Furthermore, although manual adjustment of the distal positioning device 194 (and consequent adjustment of the proximal positioning device 192) is preferred, automated or power-assisted operation is permissible according to some aspects of the present invention. Furthermore, such operation may suitably be facilitated by any control system known in the art, including but not limited to a wireless remote control system as discussed about with regard to other features of the vehicle 10.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. A vehicle comprising:
a frame;
a plurality of tanks supported on the frame,
each of said tanks defining a tank interior configured to house particulate;
an unloading system configured to unload the particulate from the tank interiors,
said unloading system including a plurality of individual carriers, each of which corresponds to one or more of the tanks,
each of said carriers defining an intake opening for receiving particulate from the corresponding one or more of the tanks, a discharge opening for dispensing particulate, a particulate pathway extending between and interconnecting the intake opening and the discharge opening, and a conveying mechanism for moving particulate along the pathway; and
a carrier positioning system including—
an elongated positioning rail, and
a plurality of positioning devices mounted to the positioning rail and corresponding to respective ones of the carriers,
each of said positioning devices having an unlocked configuration enabling independent shifting of the positioning device along the positioning rail and a locked configuration at least substantially restricting shifting of the positioning device along the positioning rail,
shifting of each of said positioning devices resulting in shifting of the corresponding one of the discharge openings.

2. The vehicle as claimed in claim 1,
said carriers being mounted to the frame such that said carriers are supported independently of the tanks.

3. The vehicle as claimed in claim 2,
said unloading system further including a plurality of flexible couplers, each of which couples the intake opening of a respective one of the carriers with the corresponding one or more of the tanks.

4. The vehicle as claimed in claim 3,
each of said couplers comprising molded rubber.

5. The vehicle as claimed in claim 3,
said carriers being moveably supported on the frame so as to be adjustably positionable relative to the tanks,
each of said couplers maintaining interconnection between the intake opening of the respective one of the carriers and the corresponding one or more of the tanks as the carriers are positioned.

6. The vehicle as claimed in claim 3,
said couplers accommodating shifting of the intake opening relative to the tank interior while maintaining the interconnection between the intake opening and the corresponding one or more of the tanks.

7. The vehicle as claimed in claim 2,
each of said carriers comprising an auger assembly,
said conveying mechanism being an auger.

8. The vehicle as claimed in claim 2,
each of said tanks being supported on the frame independently of one another.

9. The vehicle as claimed in claim 2,
said vehicle further comprising a plurality of load cells corresponding to the tanks,
said load cells mounted to the frame and isolated from the carriers.

10. The vehicle as claimed in claim 2,
said carriers being moveably supported on the frame so as to be adjustably positionable relative to the tanks.

11. The vehicle as claimed in claim 10,
each of said tanks being supported on the frame independently of one another,
said vehicle further comprising a plurality of load cells corresponding to the tanks,
said load cells mounted to the frame and isolated from the carriers.

12. The vehicle as claimed in claim 11,
said unloading system further including a plurality of flexible couplers, each of which couples the intake opening of a respective one of the carriers with the corresponding one or more of the tanks.

13. The vehicle as claimed in claim 1,
said vehicle further comprising a lifting mechanism for adjustably vertically positioning each of the discharge openings,
said lifting mechanism including the positioning rail, said positioning rail at least partially supporting each of the carriers,
said positioning rail being shiftable, with generally vertical shifting of the positioning rail simultaneously raising or lowering each of the discharge openings.

14. The vehicle as recited in claim 13,
said positioning rail extending along a generally fore-and-aft direction relative to a travel direction of the vehicle.

15. The vehicle as claimed in claim 13,
said lifting mechanism further including a brace including a proximal end pivotably secured relative to the frame and a distal end secured to the positioning rail, with pivoting of the brace causing corresponding shifting of the positioning rail and raising or lowering of each of the discharge openings.

16. The vehicle as claimed in claim 15,
said lifting mechanism further including a hydraulic cylinder coupled to the brace and the frame such that operation of the hydraulic cylinder pivotably shifts the brace and, in turn, the positioning rail.

17. The vehicle as claimed in claim 16,
said frame including spaced apart top and bottom frame rails,
said hydraulic cylinder being secured to the top frame rail,
said lifting mechanism including a bracket fixed to and extending generally orthogonally relative to the bottom frame rail,
said proximal end of the brace being pivotably secured to the bracket.

18. The vehicle as claimed in claim 17,
said lifting mechanism further including a second positioning rail,
said second positioning rail at least in part supporting the carriers adjacent the intake openings,
said proximal end of the brace being fixed to the second positioning rail such that pivoting of the brace results in corresponding shifting of the second positioning rail and, in turn, each of the carriers adjacent the intake openings.

19. The vehicle as claimed in claim 18,
said positioning rails being spaced vertically from one another.

20. The vehicle as claimed in claim 13,
said carriers being mounted to the frame such that said carriers are supported independently of the tanks.

21. The vehicle as claimed in claim 13,
said unloading system further including a plurality of flexible couplers, each of which couples the intake opening of a respective one of the carriers with the corresponding one or more of the tanks.

22. The vehicle as recited in claim 1,
each of said positioning devices including a bracket circumscribing the positioning rail and supporting the corresponding one of the carriers.

23. The vehicle as recited in claim 22,
each of said brackets including—
a shift plate defining a slot extending generally perpendicular to the positioning rail, and
a fastener extending through the slot and at least in part securing the shift plate relative to the positioning rail,
said slot enabling shifting of the shift plate and the corresponding carrier relative to the fastener and the positioning rail.

24. The vehicle as recited in claim 23,
each of said shift plates defining two pairs of said slots,
each pair of slots including a proximal slot and a distal slot spaced from the proximal slot such that the positioning rail extends between the proximal and distal slots,
each of said brackets including a pair of said fasteners,
each of said fasteners comprising a U-bolt having a proximal end extending through the proximal slot and a distal end extending through the distal slot.

25. The vehicle as recited in claim 23,
each of said brackets having an unlocked configuration corresponding to a loosened fastener and a locked configuration corresponding to a tightened fastener,
said bracket being shiftable relative to the positioning rail in the unlocked configuration and at least substantially fixed relative to the positioning rail in the locked configuration.

26. The vehicle as recited in claim 22,
said frame including a generally axially extending frame rail,
said carrier positioning system further including—
an elongated second positioning rail laterally spaced from and supported relative to the frame rail, and
a plurality of second positioning devices mounted to the second positioning rail and corresponding to respective ones of the carriers.

27. The vehicle as recited in claim 26,
each of said second positioning devices including—
a pivot plate defining a generally arcuate pivot slot,
a base plate fixed to the second positioning rail and defining a fastener-receiving hole corresponding to the pivot slot,
said pivot plate being fixed to the corresponding carrier adjacent the corresponding intake opening, and
a second fastener extending through the pivot slot and the fastener-receiving hole to pivotably secure the pivot plate relative to the base plate and the second positioning rail,
shifting of each of said positioning devices along the positioning rail resulting in shifting of the corresponding second fastener in the corresponding pivot slot and, in turn, pivoting of the corresponding pivot plate and intake opening relative to the corresponding base plate and the second positioning rail.

28. The vehicle as recited in claim 27,
each of said pivot plates defining a pair of said pivot slots,
said pivot slots being axially spaced apart and extending along a shared arc,
each of said base plates including a pair of said fastener-receiving holes corresponding to the pair of pivot slots,
each of said second positioning devices including a pair of said second fasteners.

29. The vehicle as recited in claim 27,
each of said pivot plates defining a pivot pin,
each of said base plates defining a pinhole,
each of said pivot pins being rotatably received in a corresponding one of the pinholes such that the corresponding carrier is pivotable about the pivot pin.

30. The vehicle as recited in claim 26,
said positioning rail and said second positioning rail being vertically spaced apart.

31. The vehicle as recited in claim 1,
said vehicle having a fore end and an aft end defining an axis therebetween,
said positioning devices being shiftable in a fore-and-aft direction along the positioning rail.

* * * * *